United States Patent
Tian et al.

(10) Patent No.: US 8,546,737 B2
(45) Date of Patent: Oct. 1, 2013

(54) SYSTEMS AND METHODS FOR COLOR BINNING

(75) Inventors: Hui Tian, Cupertino, CA (US); Jess Jan Young Lee, Woodside, CA (US); Pierre Henri Rene Della Nave, Mountain View, CA (US)

(73) Assignee: InVisage Technologies, Inc., Menlo Parl, CA (US)

( * ) Notice: Subject to any disclaimer, the term of this patent is extended or adjusted under 35 U.S.C. 154(b) by 0 days.

(21) Appl. No.: 12/914,480

(22) Filed: Oct. 28, 2010

(65) Prior Publication Data

US 2011/0101205 A1  May 5, 2011

Related U.S. Application Data

(60) Provisional application No. 61/256,914, filed on Oct. 30, 2009.

(51) Int. Cl.
*H01L 27/00* (2006.01)
*H01J 40/14* (2006.01)

(52) U.S. Cl.
USPC ............... 250/208.1; 250/226; 250/214 R

(58) Field of Classification Search
USPC ............ 250/208.1, 226, 214 R, 214.1, 216;
348/268, 269, 272, 273, 277–279, 281, 294;
257/225, 229, 230, 231, 233, 414, 428, 431,
257/432
See application file for complete search history.

(56) References Cited

U.S. PATENT DOCUMENTS

| | | | |
|---|---|---|---|
| 7,319,218 B2 * | 1/2008 | Krymski | 250/208.1 |
| 7,745,773 B1 | 6/2010 | Merrill | |
| 2004/0069930 A1 * | 4/2004 | Zarnowski et al. | 250/208.1 |
| 2008/0079807 A1 * | 4/2008 | Inuiya et al. | 348/70 |
| 2009/0195681 A1 * | 8/2009 | Compton et al. | 348/308 |
| 2009/0322917 A1 * | 12/2009 | Kyogoku et al. | 348/273 |
| 2010/0309351 A1 | 12/2010 | Smith et al. | |

OTHER PUBLICATIONS

"International Application Serial No. PCT/US2010/054518, Written Opinion mailed Dec. 22, 2010", 4 pgs.
"Internationai Application Serial No. PCT/US2010/054518, Search Report mailed Dec. 22, 2010", 2 pgs.
"International Application Serial No. PCT/US2010/54518, International Preliminary Report on Patentability mailed May 23, 2012", 19 pgs.

* cited by examiner

*Primary Examiner* — Pascal M Bui Pho
(74) *Attorney, Agent, or Firm* — Schwegman Lundberg & Woessner, P.A.

(57) ABSTRACT

In various exemplary embodiments, optically sensitive devices comprise a plurality of pixel regions. Each pixel region includes an optically sensitive layer over a substrate and has subpixel regions for separate wavebands. A pixel circuit comprises a charge store and a read out circuit for each subpixel region. Circuitry is configured to select a plurality of subpixel elements from different pixels that correspond to the same waveband for simultaneous reading to a shared read out circuit.

8 Claims, 15 Drawing Sheets

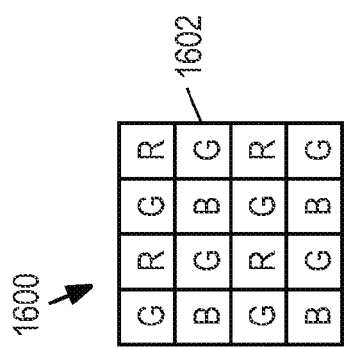
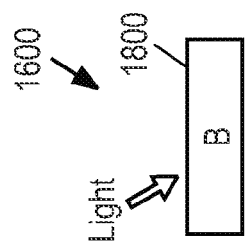
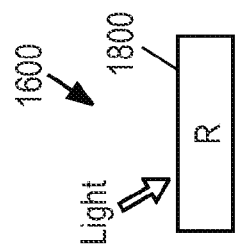
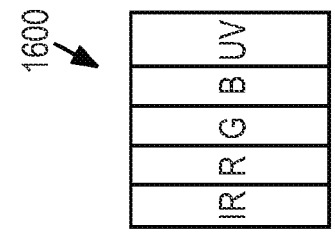
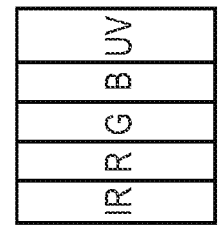
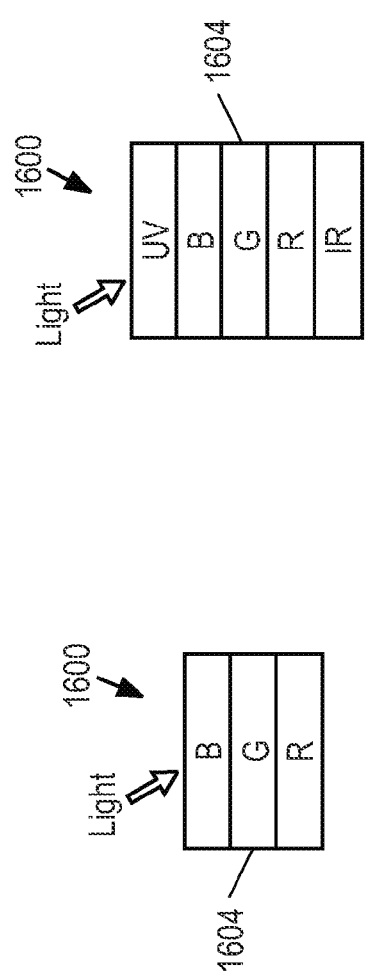

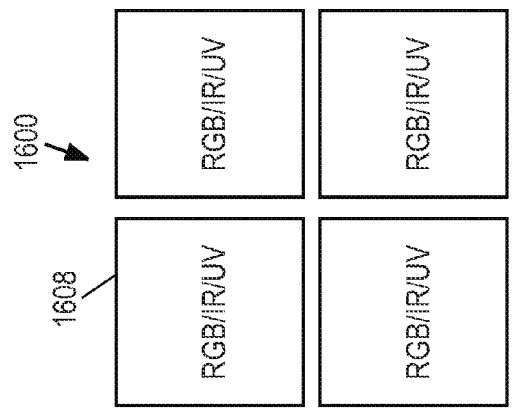
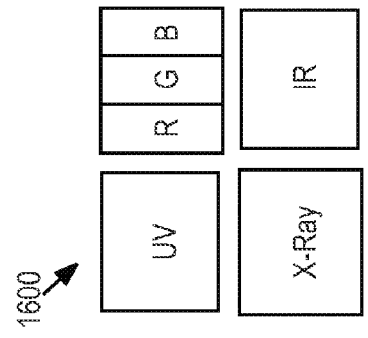
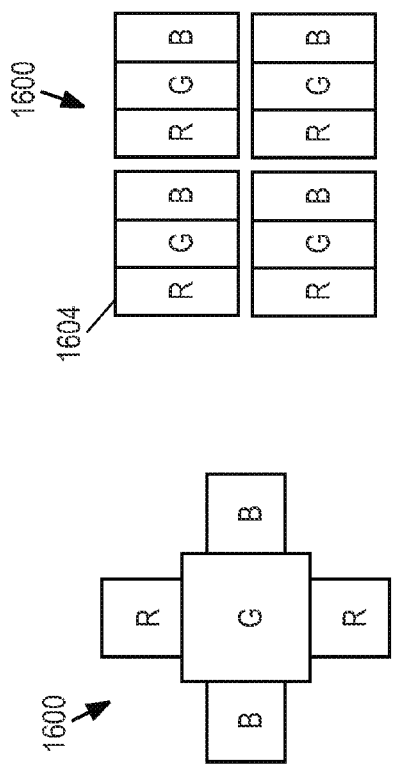
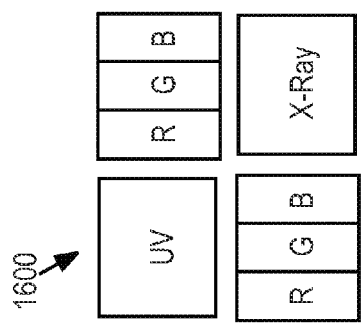
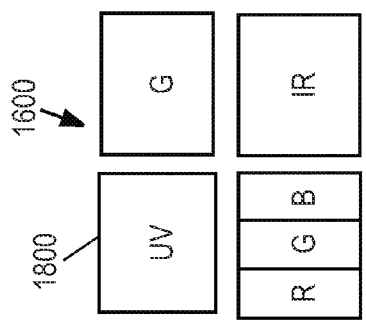

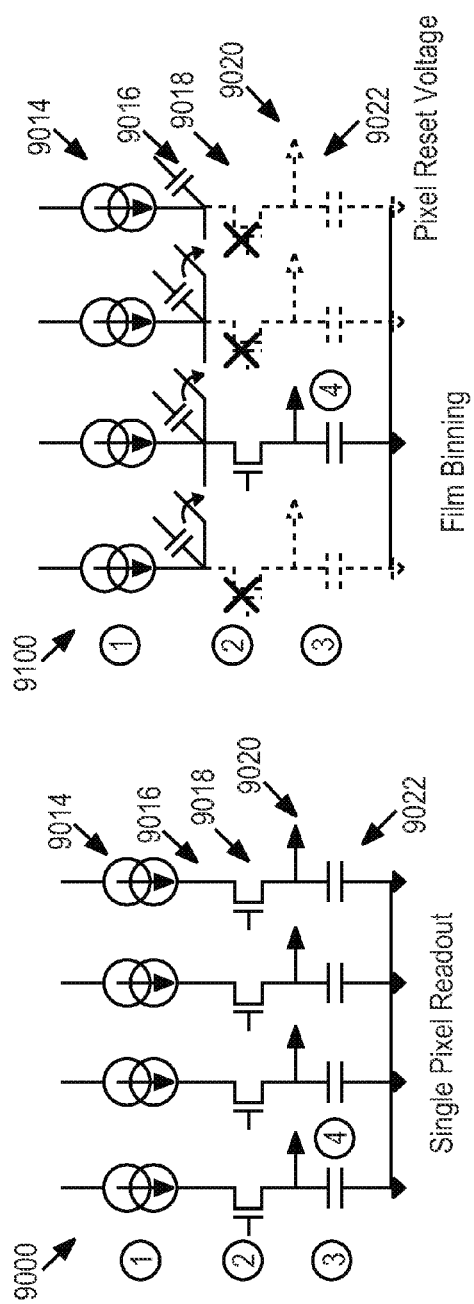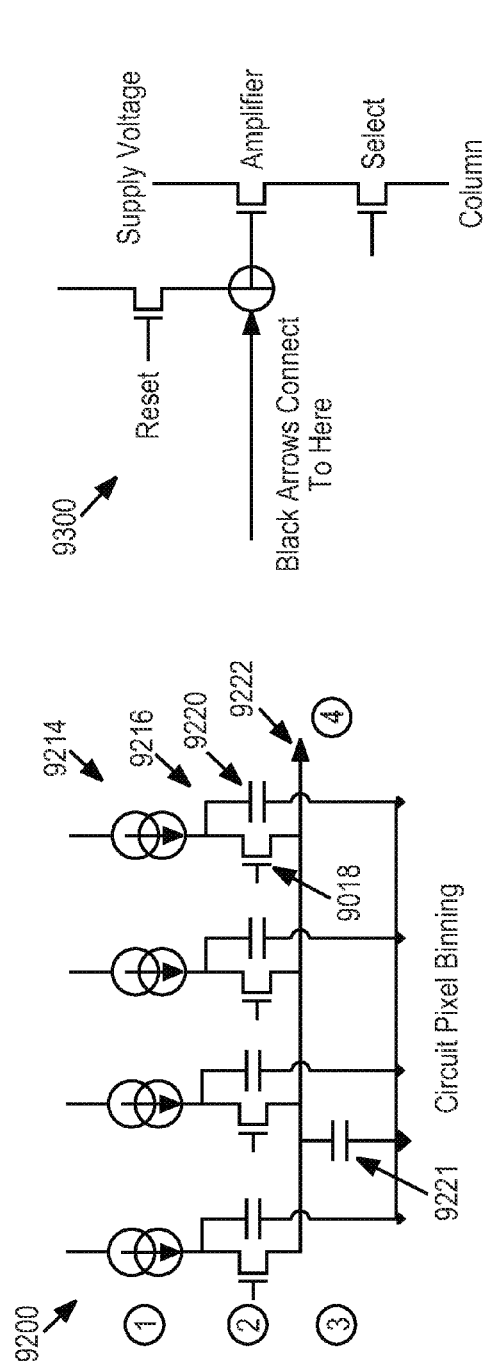

US 8,546,737 B2

SYSTEMS AND METHODS FOR COLOR BINNING

This application claims the benefit of priority under 35 U.S.C. 119(e) to U.S. Provisional Patent Application Ser. No. 61/256,914, filed on Oct. 30, 2009, which is incorporated herein by reference in its entirety.

TECHNICAL FIELD

The present invention generally relates to optical and electronic devices, systems and methods that include optically sensitive material, such as nanocrystals or other optically sensitive material, and methods of making and using the devices and systems.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

BRIEF DESCRIPTION OF FIGURES

The systems and methods described herein may be understood by reference to the following figures:

FIG. 5a shows a Bayer filter pattern;

FIG. 5b-f show examples of some alternative pixel layouts;

FIG. 5g-l show pixels of different sizes, layouts and types used in pixel layouts;

FIG. 9 A-D illustrate pixel circuitry for binning that may be used in example embodiments.

Figure 1:
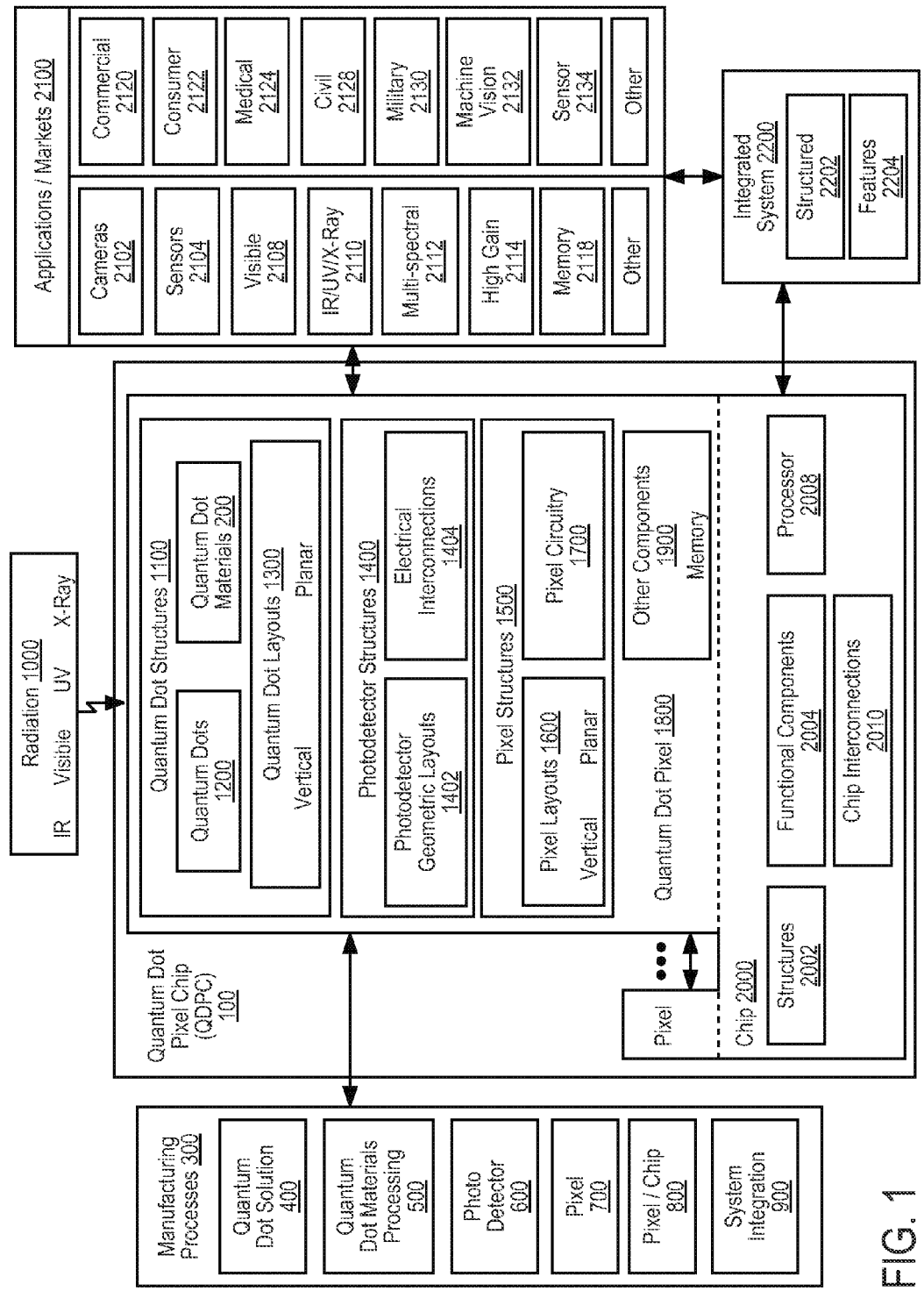
FIG. 1 shows overall structure and areas according to an embodiment.

Embodiments are described, by way of example only, with reference to the accompanying drawings. The drawings are not necessarily to scale. For clarity and conciseness, certain features of the embodiment may be exaggerated and shown in schematic form.

DESCRIPTION

Example embodiments provide image sensors that use an array of pixel elements to detect an image. The pixel elements may include photosensitive material. The image sensor may detect a signal from the photosensitive material in each of the pixel regions that varies based on the intensity of light incident on the photosensitive material. In one example embodiment, the photosensitive material is a continuous film of interconnected nanoparticles. Electrodes are used to apply a bias across each pixel area. Pixel circuitry is used to integrate a signal in a charge store over a period of time for each pixel region. The circuit stores an electrical signal proportional to the intensity of light incident on the optically sensitive layer during the integration period. The electrical signal can then be read from the pixel circuitry and processed to construct a digital image corresponding to the light incident on the array of pixel elements. In example embodiments, the pixel circuitry may be formed on an integrated circuit device below the photosensitive material. For example, a nanocrystal photosensitive material may be layered over a CMOS integrated circuit device to form an image sensor. Metal contact layers from the CMOS integrated circuit may be electrically connected to the electrodes that provide a bias across the pixel regions. U.S. patent application Ser. No. 12/10625, titled "Materials, Systems and Methods for Optoelectronic Devices", filed Apr. 18, 2008 (Publication No. 20090152664) includes additional descriptions of optoelectronic devices, systems and materials that may be used in connection with example embodiments and is hereby incorporated herein by reference in its entirety. This is an example embodiment only and other embodiments may use different photodetectors and photosensitive materials. For example, embodiments may use silicon or Gallium Arsenide (GaAs) photodetectors.

In example embodiments, an image sensor may be provided with a large number of pixel elements to provide high resolution. For example, an array of 4, 6, 8, 12 or more megapixels may be provided. To provide a color image sensor, each pixel may have color subpixel elements. For example, red, blue and green subpixels may be provided for each pixel. The signal from each color subpixel may be read out separately in example embodiments. In an example embodiment, electrodes provide a bias across each color subpixel and a signal is integrated over a period of time and then read out of the pixel circuit. The different color subpixels may be provided by positioning a color filter over the photosensitive material. The color filter permits the desired color of light to pass through to the photosensitive material for each color subpixel and blocks the other colors. In an alternative embodiment, different photosensitive materials may be used in each color subpixel region, where the photosensitive material is sensitive to the desired color of light for the respective subpixel region. In other embodiments, vertically stacked layers of photosensitive material may be used, with different layers being sensitive to different colors to provide the color subpixel elements for each pixel.

In example embodiments, the array of pixels and color subpixel elements may be relatively small. For example, an entire array of 2 megapixels may be less than about 3,000 microns by about 2,000 microns, an array of 4 megapixels may be less than about 4,250 microns by about 2,850 microns, and an array of 8 megapixels may be less than about 6,000 microns by about 4,000 microns. Each color subpixel region may be 2 microns square or less in some embodiments, or 1.5 microns square or less in some embodiments. In some example embodiments, each subpixel is about 1.4 microns square. In another example embodiment, each subpixel is about 1.1 micron square. Small sized, dense arrays of pixels may be used for applications such as cameras on cell phones where high resolution is desired, but a small image sensor is required.

In example embodiments, multiple modes of operation may be provided. In some modes, high resolution may be provided where a signal is read from each smallest subpixel element in the array. In other modes, subpixel elements may be binned together to provide a lower resolution image. In example embodiments, the subpixels for each color element may be binned for 2, 3, 4 or more pixels to provide separate color elements for a larger superpixel. The subpixels that are binned together may be color subpixels from two or more adjacent subpixels. For example, the green, blue or red subpixels for two adjacent pixels may be combined to form green, blue and red color elements for a superpixel that is twice as large as the original pixel. Various patterns of pixels may be binned together. For example, color subpixels for a block of four pixels may be binned (2 adjacent pixels from one row together with two adjacent pixels from an adjacent row may have each of their green, blue and red color subpixel elements combined into larger green, blue and red color elements). In another example, an "L" shaped group of subpixels may be binned together (two subpixels in one row together with a subpixel from an adjacent row that is in the same column as one of those two subpixels). In other embodiments, subpixels of the same color from adjacent pixels may align diagonally and be binned together to provide a color element for a superpixel. In some embodiments, subpixels for one of the color elements are binned together before being read out of the pixel circuit and subpixels for other circuit elements are read out separately. For example, in some embodiments, green subpixels from multiple pixels are binned together and red and blue subpixels are read out separately.

In some embodiments, binning may be used to provide higher sensitivity. For example, binning may be used to detect images under lower light conditions or may be used for video where a lower resolution may be desired to reduce storage requirements. For example, a signal from a larger area of optically sensitive material may be read into a charge store. The signal increases linearly with area which boosts the signal to noise ratio (SNR). For example, in a small, high resolution image sensor array, adjacent regions of the film may be binned by changing the electrodes that provide a bias across the film. For example, some electrodes may be disabled so a bias is applied across a larger region of the film.

In example embodiments for film binning, subpixels for the same colors are binned together from multiple pixels so that color can still be distinguished. If all of the color elements of a pixel are binned together, the color resolution is lost. In typical pixel layouts, the color subpixels alternate between different colors. If film binning is used to bin adjacent regions having different colors, the colors can no longer be distinguished. In example embodiments, the color subpixels are arranged in patterns where subpixels for the same color are positioned adjacent to one another. Various patterns may be used as shown in FIGS. 8 A, B and C and as further described below. In a high resolution mode, a separate signal is read into a separate charge store for each of the adjacent subpixels. For binning mode, electrodes may be arranged in patterns where a bias may be applied across multiple adjacent subpixels for the same color and integrated into a common charge store. In example embodiments, film binning may be used to read out a combined signal for multiple subpixel regions into a single charge store. The charge store may be one of the charge stores used for an individual subpixel in the high resolution mode. The charge store for the other adjacent subpixels may be switched off in binning mode. As a result, film binning can be achieved while retaining the ability to detect a color image. In an alternative embodiment, more than one (or all) of the charge stores used in high resolution mode may be used in film binning mode to provide higher dynamic range (see discussion of dynamic range with respect to circuit binning below).

In another approach, analog circuitry may be used to combine the signals read out from multiple pixel or subpixel regions. This is referred to as circuit binning. In example embodiments, a signal may be integrated for each smallest subpixel, but the signal may be combined in the analog pixel circuitry and read out as a single signal for the entire pixel. The subpixel regions that are binned may correspond to subpixel elements for the same color from two or more pixels. However, the subpixel elements do not need to be adjacent and can be separated by subpixel elements for other colors. The circuitry used for binning can be routed under the optically sensitive material to connect subpixels for binning even if they are not from adjacent or contiguous regions of the optically sensitive material. Since the optically sensitive material is over the integrated circuit device where the pixel circuitry is located, the pixel circuitry can be routed under adjacent subpixels (of different colors) to reach a non-adjacent subpixel (having the same color) in order to bin the same colors together from different pixels even though the subpixels are not next to each other.

In some circuit binning embodiments, each subpixel element may be read out using the same charge store used to read out the subpixel in full resolution mode. In this way, the charge stores used to read out the subcomponent signals for the binned signal may have a higher capacitance that a film binning mode where only one of the charge stores is used to read the signal from multiple subpixel regions of the optically sensitive material. In this example, the charge stores for circuit binning have a larger total capacitance than the charge store used for film binning across the same number of subpixel regions. While this does not provide the same sensitivity as the film binning approach, the higher capacitance results in higher dynamic range.

In another approach, a signal may be read out for each subpixel and combined digitally after it is read out. This is referred to as digital binning. However, while digital binning can boost up the signal, it at the same time accumulates quantization error and signal chain noises from each pixel. As a result the noise floor after digital binning goes up significantly, and thus limits the SNR improvement. With film binning, the noise floor doesn't go up, while signal increases linearly with binning pixel area. Therefore film binning can offer significant SNR improvement.

In some embodiments, the image sensor or camera may have multiple modes of operation that use different binning techniques or combining multiple binning techniques. In some embodiments, both film binning and circuit binning may be used. For example, it may be desired to bin signals from a large number of pixels. Film binning may be used to combine color subpixels that are adjacent (for example, from 2, 3 or 4 adjacent pixels). Circuit binning can then combine these signals with binned signals for other pixels where the subpixels for the same color are not adjacent. In this way, 4, 6, 8, 9, 12, 16 or more pixels may be binned while preserving different signals for each color. In another embodiment, film binning may be used to combine subpixels for some colors (for example, for the green color elements of adjacent pixels) while circuit binning or digital binning is used to combine subpixels for the other color elements (for example, red and blue) to provide separate color elements for a superpixel that combines the signals for two or more smallest patterned pixels. In another example embodiment, three or more modes may be provided using multiple binning techniques, including for example a high resolution mode where each smallest subpixel is read out individually to a separate charge store, a film binning modes where multiple subpixels are combined in a common charge store to provide higher sensitivity, and a circuit binning mode with higher capacitance for the charge store(s) used to read the binned subpixels than the film binning mode to provide higher dynamic range, A video mode may also be provided where multiple frames of images are read in sequence using one of the binning modes of operation with lower resolution per frame than the full resolution mode, but which may have higher sensitivity or dynamic range based on the type of binning that is used in video mode.

In other embodiments, subpixel elements configured to sense radiation outside of the visible range may also be binned together. For example, ultraviolet (UV) or infrared (IR) subpixel elements may be binned together. Subpixels for different wavebands within UV or IR may also be binned together similar to binning of separate color elements. In some embodiments, UV and/or IR wavebands may be provided in addition to subpixel elements for wavebands of visible radiation (such as color wavebands for R, G, B and/or Y, U, V color elements). Subpixels may be configured to detect different wavebands of radiation based on color filters used to filter different radiation for different subpixel regions and/or by using different layers or regions of optically sensitive material that are configured to sense the respective range of radiation.

General architecture and features of example embodiments of image sensors will now be described, followed by a more detailed description of the color filters and circuitry that may be used for color binning in example embodiments. These embodiments are examples only and other image sensor architectures may be used in other embodiments to provide color binning.

General Architecture and Features of a Quantum Do Pixel Chip Image Sensor.

Image sensors incorporate arrays of photodetectors. These photodetectors sense light, converting it from an optical to an electronic signal. FIG. 1 shows structure of and areas relating to quantum dot pixel chip structures (QDPCs) 100, according to example embodiments. As illustrated in FIG. 1, the QDPC 100 may be adapted as a radiation 1000 receiver where quantum dot structures 1100 are presented to receive the radiation 1000, such as light. The QDPC 100 includes, as will be described in more detail herein, quantum dot pixels 1800 and a chip 2000 where the chip is adapted to process electrical signals received from the quantum dot pixel 1800. The quantum dot pixel 1800 includes the quantum dot structures 1100 include several components and sub components such as quantum dots 1200, quantum dot materials 200 and particular configurations or quantum dot layouts 300 related to the dots 1200 and materials 200. The quantum dot structures 1100 may be used to create photodetector structures 1400 where the quantum dot structures are associated with electrical interconnections 1404. The electrical connections 1404 are provided to receive electric signals from the quantum dot structures and communicate the electric signals on to pixel circuitry 1700 associated with pixel structures 1500. Just as the quantum dot structures 1100 may be laid out in various patterns, both planar and vertical, the photodetector structures 1400 may have particular photodetector geometric layouts 1402. The photodetector structures 1400 may be associated with pixel structures 1500 where the electrical interconnections 1404 of the photodetector structures are electrically associated with pixel circuitry 1700. The pixel structures 1500 may also be laid out in pixel layouts 1600 including vertical and planar layouts on a chip 2000 and the pixel circuitry 1700 may be associated with other components 1900, including memory for example. The pixel circuitry 1700 may include passive and active components for processing of signals at the pixel 1800 level. The pixel 1800 is associated both mechanically and electrically with the chip 2000. In example embodiments, the pixel structures 1500 and pixel circuitry 1700 include structures and circuitry for film binning and/or circuit binning of separate color elements for multiple pixels as described above and below in connection with FIGS. 8-12. From an electrical viewpoint, the pixel circuitry 1700 may be in communication with other electronics (e.g. chip processor 2008). The other electronics may be adapted to process digital signals, analog signals, mixed signals and the like and it may be adapted to process and manipulate the signals received from the pixel circuitry 1700. In other embodiments, a chip processor 2008 or other electronics may be included on the same semiconductor substrate as the QDPCs and may be structured using a system-on-chip architecture. The other electronics may include circuitry or software to provide digital binning in example embodiments. The chip 2000 also includes physical structures 2002 and other functional components 2004, which will also be described in more detail below.

The QDPC 100 detects electromagnetic radiation 1000, which in embodiments may be any frequency of radiation from the electromagnetic spectrum. Although the electromagnetic spectrum is continuous, it is common to refer to ranges of frequencies as bands within the entire electromagnetic spectrum, such as the radio band, microwave band, infrared band (IR), visible band (VIS), ultraviolet band (UV), X-rays, gamma rays, and the like. The QDPC 100 may be capable of sensing any frequency within the entire electromagnetic spectrum; however, embodiments herein may reference certain bands or combinations of bands within the electromagnetic spectrum. It should be understood that the use of these bands in discussion is not meant to limit the range of frequencies that the QDPC 100 may sense, and are only used as examples. Additionally, some bands have common usage sub-bands, such as near infrared (NIR) and far infrared (FIR), and the use of the broader band term, such as IR, is not meant to limit the QDPCs 100 sensitivity to any band or sub-band. Additionally, in the following description, terms such as "electromagnetic radiation", "radiation", "electromagnetic spectrum", "spectrum", "radiation spectrum", and the like are used interchangeably, and the term color is used to depict a select band of radiation 1000 that could be within any portion of the radiation 1000 spectrum, and is not meant to be limited to any specific range of radiation 1000 such as in visible 'color'.

In the example embodiment of FIG. 1, the nanocrystal materials and photodetector structures described above may be used to provide quantum dot pixels 1800 for a photosensor array, image sensor or other optoelectronic device. In example embodiments, the pixels 1800 include quantum dot structures 1100 capable of receiving radiation 1000, photodetectors structures adapted to receive energy from the quantum dot structures 1100 and pixel structures. The quantum dot pixels described herein can be used to provide the following in some embodiments: high fill factor, color binning, potential to stack, potential to go to small pixel sizes, high performance from larger pixel sizes, simplify color filter array, elimination of de-mosaicing, self-gain setting/automatic gain control, high dynamic range, global shutter capability, auto-exposure, local contrast, speed of readout, low noise readout at pixel level, ability to use larger process geometries (lower cost), ability to use generic fabrication processes, use digital fabrication processes to build analog circuits, adding other functions below the pixel such as memory, A to D, true correlated double sampling, binning, etc. Example embodiments may provide some or all of these features. However, some embodiments may not use these features.

A quantum dot 1200 may be a nanostructure, typically a semiconductor nanostructure, that confines a conduction band electrons, valence band holes, or excitons (bound pairs of conduction band electrons and valence band holes) in all three spatial directions. A quantum dot exhibits in its absorption spectrum the effects of the discrete quantized energy spectrum of an idealized zero-dimensional system. The wave functions that correspond to this discrete energy spectrum are typically substantially spatially localized within the quantum dot, but extend over many periods of the crystal lattice of the material.

Figure 2:
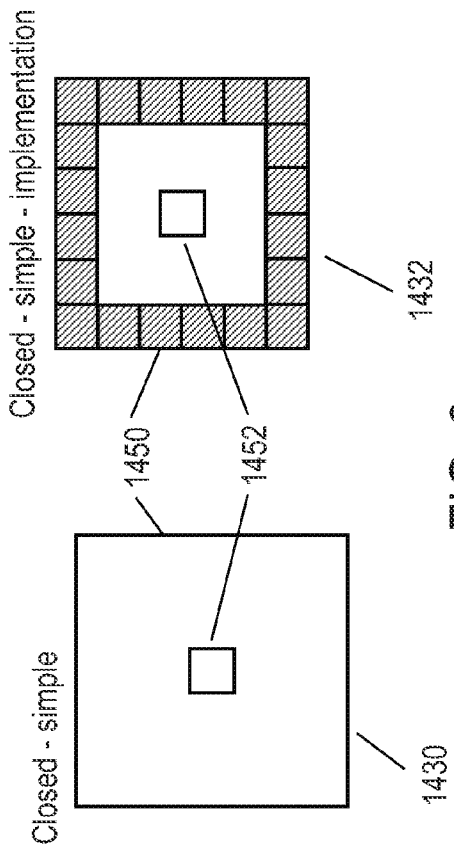
FIG. 2 shows an example of a quantum dot 1200.

FIG. 2 shows an example of a quantum dot 1200. In one example embodiment, the QD 1200 has a core 1220 of a semiconductor or compound semiconductor material, such as PbS. Ligands 1225 may be attached to some or all of the outer surface or may be removed in some embodiments as described further below. In some embodiments, the cores 1220 of adjacent QDs may be fused together to form a continuous film of nanocrystal material with nanoscale features. In other embodiments, cores may be connected to one another by linker molecules.

Some embodiments of the QD optical devices are single image sensor chips that have a plurality of pixels, each of which includes a QD layer that is radiation 1000 sensitive, e.g., optically active, and at least two electrodes in electrical communication with the QD layer. The current and/or voltage between the electrodes is related to the amount of radiation 1000 received by the QD layer. Specifically, photons absorbed by the QD layer generate electron-hole pairs, such that, if an electrical bias is applied, a current flows. By determining the current and/or voltage for each pixel, the image across the chip can be reconstructed. The image sensor chips have a high sensitivity, which can be beneficial in low-radiation-detecting 1000 applications; a wide dynamic range allowing for excellent image detail; and a small pixel size. The responsivity of the sensor chips to different optical wavelengths is also tunable by changing the size of the QDs in the device, by taking advantage of the quantum size effects in QDs. The pixels can be made as small as 1 square micron or less, or as large as 30 by 30 microns or more or any range subsumed therein.

The photodetector structure 1400 is a device configured so that it can be used to detect radiation 1000 in example embodiments. The detector may be 'tuned' to detect prescribed wavelengths of radiation 1000 through the types of quantum dot structures 1100 that are used in the photodetector structure 1400. The photodetector structure can be described as a quantum dot structure 1100 with an I/O for some input/output ability imposed to access the quantum dot structures' 1100 state. Once the state can be read, the state can be communicated to pixel circuitry 1700 through an electrical interconnection 1404, wherein the pixel circuitry may include electronics (e.g., passive and/or active) to read the state. In an embodiment, the photodetector structure 1400 may be a quantum dot structure 1100 (e.g., film) plus electrical contact pads so the pads can be associated with electronics to read the state of the associated quantum dot structure.

In embodiments, processing may include binning of pixels in order to reduce random noise associated with inherent properties of the quantum dot structure 1100 or with readout processes. Binning may involve the combining of pixels 1800, such as creating 2×2, 3×3, 5×5, or the like superpixels. There may be a reduction of noise associated with combining pixels 1800, or binning, because the random noise increases by the square root as area increases linearly, thus decreasing the noise or increasing the effective sensitivity. With the QDPC's 100 potential for very small pixels, binning may be utilized without the need to sacrifice spatial resolution, that is, the pixels may be so small to begin with that combining pixels doesn't decrease the required spatial resolution of the system. Binning may also be effective in increasing the speed with which the detector can be run, thus improving some feature of the system, such as focus or exposure. In example embodiments, binning may be used to combine subpixel elements for the same color or range of radiation (including UV and/or IR) to provide separate elements for a superpixel while preserving color/UV/IR resolution as further described below.

In embodiments the chip may have functional components that enable high-speed readout capabilities, which may facilitate the readout of large arrays, such as 5 Mpixels, 6 Mpixels, 8 Mpixels, 12 Mpixels, or the like. Faster readout capabilities may require more complex, larger transistor-count circuitry under the pixel 1800 array, increased number of layers, increased number of electrical interconnects, wider interconnection traces, and the like.

In embodiments, it may be desirable to scale down the image sensor size in order to lower total chip cost, which may be proportional to chip area. However, shrinking chip size may mean, for a given number of pixels, smaller pixels. In existing approaches, since radiation 1000 must propagate through the interconnect layer onto the monolithically integrated silicon photodiode lying beneath, there is a fill-factor compromise, whereby part of the underlying silicon area is obscured by interconnect; and, similarly, part of the silicon area is consumed by transistors used in read-out. One workaround is micro-lenses, which add cost and lead to a dependence in photodiode illumination on position within the chip (center vs. edges); another workaround is to go to smaller process geometries, which is costly and particularly challenging within the image sensor process with its custom implants.

In embodiments, the technology discussed herein may provide a way around these compromises. Pixel size, and thus chip size, may be scaled down without decreasing fill factor. Larger process geometries may be used because transistor size, and interconnect line-width, may not obscure pixels since the photodetectors are on the top surface, residing above the interconnect. In the technology proposed herein, large geometries such as 0.13 um and 0.18 um may be employed without obscuring pixels. Similarly, small geometries such as 90 nm and below may also be employed, and these may be standard, rather than image-sensor-customized, processes, leading to lower cost. The use of small geometries may be more compatible with high-speed digital signal processing on the same chip. This may lead to faster, cheaper, and/or higher-quality image sensor processing on chip. Also, the use of more advanced geometries for digital signal processing may contribute to lower power consumption for a given degree of image sensor processing functionality.

Figure 7:
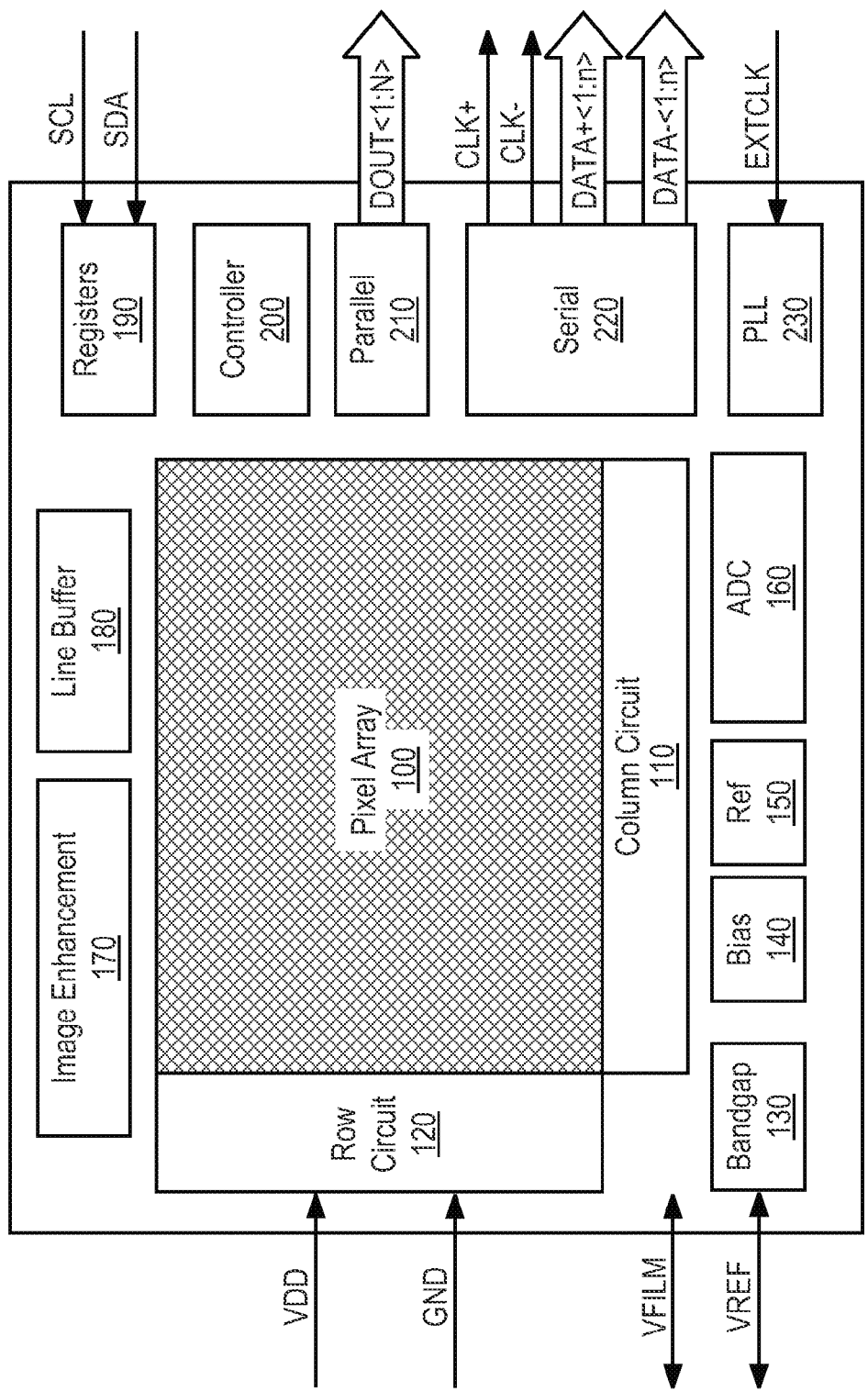
FIG. 7 is a block diagram of an example system configuration that may be used in combination with embodiments described herein.

An example integrated circuit system that can be used in combination with the above photodetectors, pixel regions and pixel circuits will now be described in connection with FIG. 7. FIG. 7 is a block diagram of an image sensor integrated circuit (also referred to as an image sensor chip). The chip includes:

- a pixel array (100) in which incident light is converted into electronic signals, and in which electronic signals are integrated into charge stores whose contents and voltage levels are related to the integrated light incident over the frame period; the pixel array may include color filters and electrode structures for color film binning as described further below;
- row and column circuits (110 & 120) which are used to reset each pixel, and read the signal related to the contents of each charge store, in order to convey the information related to the integrated light over each pixel over the frame period to the outer periphery of the chip; the pixel circuitry may include circuitry for color binning as described further below;
- analog circuits (130, 140, 150, 160, 230). The pixel electrical signal from the column circuits is fed into the analog-to-digital conversion (160) where it is converted into a digital number representing the light level at each pixel. The pixel array and ADC are supported by analog circuits that provide bias and reference levels (130, 140, & 150).
- digital circuits (170, 180, 190, 200). The Image Enhancement circuitry (170) provides image enhancement functions to the data output from ADC to improve the signal to noise ratio. Line buffer (180) temporarily stores several lines of the pixel values to facilitate digital image processing and IO functionality. (190) is a bank of registers that prescribe the global operation of the system and/or the frame format. Block 200 controls the operation of the chip. The digital circuits may also include circuits or software for digital color binning;
- IO circuits (210 & 220) support both parallel input/output and serial input/output. (210) is a parallel IO interface that outputs every bit of a pixel value simultaneously. (220) is a serial IO interface where every bit of a pixel value is output sequentially.
- a phase-locked loop (230) provides a clock to the whole chip.

In a particular example embodiment, when 0.11 um CMOS technology node is employed, the periodic repeat distance of pixels along the row-axis and along the column-axis may be 900 nm, 1.1 um, 1.2 um, 1.4 um, 1.75 um, 2.2 um, or larger. The implementation of the smallest of these pixels sizes, especially 900 nm, 1.1 um, and 1.2 um, may require transistor sharing among pairs or larger group of adjacent pixels in some embodiments.

Very small pixels can be implemented in part because all of the silicon circuit area associated with each pixel can be used for read-out electronics since the optical sensing function is achieved separately, in another vertical level, by the optically-sensitive layer that resides above the interconnect layer.

Because the optically sensitive layer and the read-out circuit that reads a particular region of optically sensitive material exist on separate planes in the integrated circuit, the shape (viewed from the top) of (1) the pixel read-out circuit and (2) the optically sensitive region that is read by (1); can be generally different. For example it may be desired to define an optically sensitive region corresponding to a pixel as a square; whereas the corresponding read-out circuit may be most efficiently configured as a rectangle.

In an imaging array based on a top optically sensitive layer connected through vias to the read-out circuit beneath, there exists no imperative for the various layers of metal, vias, and interconnect dielectric to be substantially or even partially optically transparent, although they may be transparent in some embodiments. This contrasts with the case of front-side-illuminated CMOS image sensors in which a substantially transparent optical path must exist traversing the interconnect stack. In the case of conventional CMOS image sensors, this presents an additional constraint in the routing of interconnect. This often reduces the extent to which a transistor, or transistors, can practically be shared. For example, 4:1 sharing is often employed, but higher sharing ratios are not. In contrast, a read-out circuit designed for use with a top-surface optically-sensitive layer can employ 8:1 and 16:1 sharing.

General Means of Making Such Chips, Including Combining Quantum Dots With a Pre-Fabricated CMOS Wafer.

Some embodiments of QD devices include a QD layer and a custom-designed or pre-fabricated electronic read-out integrated circuit. The QD layer is then formed directly onto the custom-designed or pre-fabricated electronic read-out integrated circuit. In some embodiments, wherever the QD layer overlies the circuit, it continuously overlaps and contacts at least some of the features of the circuit. In some embodiments, if the QD layer overlies three-dimensional features of the circuit, the QD layer may conform to these features. In other words, there exists a substantially contiguous interface between the QD layer and the underlying electronic readout integrated circuit. One or more electrodes in the circuit contact the QD layer and are capable of relaying information about the QD layer, e.g., an electronic signal related to the amount of radiation 1000 on the QD layer, to a readout circuit. The QD layer can be provided in a continuous manner to cover the entire underlying circuit, such as a readout circuit, or patterned. If the QD layer is provided in a continuous manner, the fill factor can approach about 100%, with patterning, the fill factor is reduced, but can still be much greater than a typical 35% for some example CMOS sensors that use silicon photodiodes.

In many embodiments, the QD optical devices are readily fabricated using techniques available in a facility normally used to make conventional CMOS devices. For example, a layer of QDs can be solution-coated onto a pre-fabricated electronic read-out circuit using, e.g., spin-coating, which is a standard CMOS process, and optionally further processed with other CMOS-compatible techniques to provide the final QD layer for use in the device. Because the QD layer need not require exotic or difficult techniques to fabricate, but can instead be made using standard CMOS processes, the QD optical devices can be made in high volumes, and with no significant increase in capital cost (other than materials) over current CMOS process steps.

The Layout of Top Metals, the Definition of Pixels, and the Reading of Currents From These Pixels Using Pixel Circuits.

Figure 4:
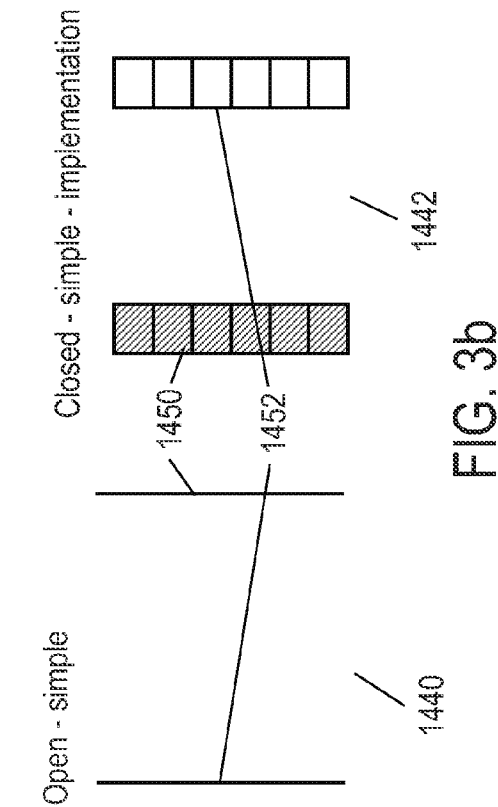
FIG. 4 shows a two-row by three-column sub-region within a generally larger array of top-surface electrodes.

FIG. 4 shows a two-row by three-column sub-region within a generally larger array of top-surface electrodes. The array of electrical contacts provides electrical communication to an overlying layer of optically sensitive material. 1401 represents a common grid of electrodes used to provide one shared contact to the optically sensitive layer. 1402 represents the pixel-electrodes which provide the other contact for electrical communication with the optically sensitive layer. In embodiments, a voltage bias of −2 V may be applied to the common grid 1401, and a voltage of +2.5 V may be applied at the beginning of each integration period to each pixel electrode 1402. Whereas the common contact 1401 is at a single electrical potential across the array at a given time, the pixel electrodes 1402 may vary in time and space across the array. For example if a circuit is configured such that the bias at 1402 varies in relation to current flowing into or out of 1402, then different electrodes 1402 may be at different biases throughout the progress of the integration period. Region 1403 represents the non-contacting region that lies between 1401 and 1402 within the lateral plane. 1403 is generally an insulating material in order to minimize dark current flowing between 1401 and 1402. 1401 and 1402 may generally consist of different materials. Each may for example be chosen for example from the list: TiN; TiN/Al/TiN; Cu; TaN; Ni; Pt; and from the preceding list there may reside superimposed on one or both contacts a further layer or set of layers chosen from: Pt, alkanethiols, Pd, Ru, Au, ITO, or other conductive or partially conductive materials.

In example embodiments using the above structures, interconnect 1452 may form an electrode in electrical communication with a capacitance, impurity region on the semiconductor substrate or other charge store. In some embodiments, a voltage is applied to the charge store and discharges due to the flow of current across the optically sensitive film over an integration period of time. At the end of the integration period of time, the remaining voltage is sampled to generate a signal corresponding to the intensity of light absorbed by the optically sensitive layer during the integration period. In other embodiments, the pixel region may be biased to cause a voltage to accumulate in a charge store over an integration period of time. At the end of the integration period of time, the voltage may be sampled to generate a signal corresponding to the intensity of light absorbed by the optically sensitive layer during the integration period. In some example embodiments, the bias across the optically sensitive layer may vary over the integration period of time due to the discharge or accumulation of voltage at the charge store. This, in turn, may cause the rate of current flow across the optically sensitive material to also vary over the integration period of time. In addition, the optically sensitive material may be a nanocrystal material with photoconductive gain and the rate of current flow may have a non-linear relationship with the intensity of light absorbed by the optically sensitive layer. As a result, in some embodiments, circuitry may be used to convert the signals from the pixel regions into digital pixel data that has a linear relationship with the intensity of light absorbed by the pixel region over the integration period of time. The non-linear properties of the optically sensitive material can be used to provide a high dynamic range, while circuitry can be used to linearize the signals after they are read in order to provide digital pixel data. Example pixel circuits for read out of signals from pixel regions are described further below.

Figure 3A:
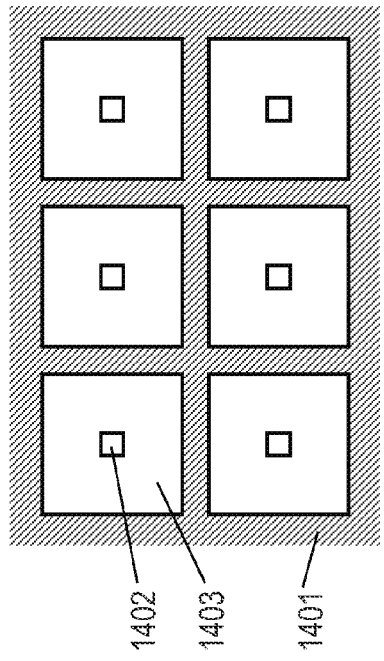
FIG. 3a shows an aspect of a closed simple geometrical arrangement of pixels.

FIG. 3a represents closed-simple patterns 1430 (e.g., conceptual illustration) and 1432 (e.g., vias used to create photodetector structures). In the closed-simple illustrations 1430-1432 the positively biased electrical interconnect 1452 is provided in the center area of a grounded contained square electrical interconnect 1450. Square electrical interconnect 1450 may be grounded or may be at another reference potential to provide a bias across the optically sensitive material in the pixel region. For example, interconnect 1452 may be biased with a positive voltage and interconnect may be biased with a negative voltage to provide a desired voltage drop across a nanocrystal material in the pixel region between the electrodes. In this configuration, when radiation 1000 to which the layer is responsive falls within the square area a charge is developed and the charge is attracted to and move towards the center positively biased electrical interconnect 1452. If these closed-simple patterns are replicated over an area of the layer, each closed simple pattern forms a portion or a whole pixel where they capture charge associated with incident radiation 1000 that falls on the internal square area. In example embodiments, the electrical interconnect 1450 may be part of a grid that forms a common electrode for an array of pixel regions. Each side of the interconnect 1450 may be shared with the adjacent pixel region to form part of the electrical interconnect around the adjacent pixel. In this embodiment, the voltage on this electrode may be the same for all of the pixel regions (or for sets of adjacent pixel regions) whereas the voltage on the interconnect 1452 varies over an integration period of time based on the light intensity absorbed by the optically sensitive material in the pixel region and can be read out to generate a pixel signal for each pixel region. In example embodiments, interconnect 1450 may form a boundary around the electrical interconnect 1452 for each pixel region. The common electrode may be formed on the same layer as interconnect 1452 and be positioned laterally around the interconnect 1450. In some embodiments, the grid may be formed above or below the layer of optically sensitive material in the pixel region, but the bias on the electrode may still provide a boundary condition around the pixel region to reduce cross over with adjacent pixel regions.

Figure 3B:
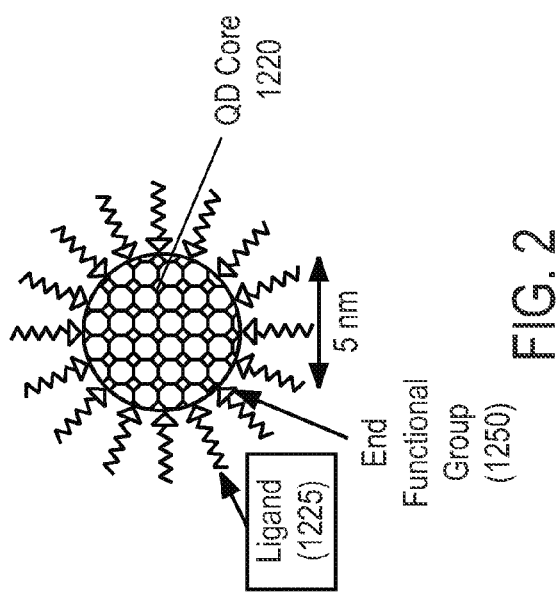
FIG. 3b shows an aspect of a open simple geometrical arrangement of pixels.

FIG. 3b illustrates open simple patterns of electrical interconnects. The open simple patterns do not, generally, form a closed pattern. The open simple pattern does not enclose a charge that is produced as the result of incident radiation 1000 with the area between the positively biased electrical interconnect 1452 and the ground 1450; however, charge developed within the area between the two electrical interconnects will be attracted and move to the positively biased electrical interconnect 1452. An array including separated open simple structures may provide a charge isolation system that may be used to identify a position of incident radiation 1000 and therefore corresponding pixel assignment. As above, electrical interconnect 1450 may be grounded or be at some other reference potential. In some embodiments, electrical interconnect 1450 may be electrically connected with the corresponding electrode of other pixels (for example, through underlying layers of interconnect) so the voltage may be applied across the pixel array. In other embodiments, the interconnect 1450 may extend linearly across multiple pixel regions to form a common electrode across a row or column.

Pixel circuitry that may be used to read out signals from the pixel regions will now be described. As described above, in embodiments, pixel structures 1500 within the QDPC 100 of FIG. 1 may have pixel layouts 1600, where pixel layouts 1600 may have a plurality of layout configurations such as vertical, planar, diagonal, or the like. Pixel structures 1500 may also have embedded pixel circuitry 1700. Pixel structures may also be associated with the electrical interconnections 1404 between the photodetector structures 1400 and pixel circuitry 1700.

In embodiments, quantum dot pixels 1800 within the QDPC 100 of FIG. 1 may have pixel circuitry 1700 that may be embedded or specific to an individual quantum dot pixel 1800, a group of quantum dot pixels 1800, all quantum dot pixels 1800 in an array of pixels, or the like. Different quantum dot pixels 1800 within the array of quantum dot pixels 1800 may have different pixel circuitry 1700, or may have no individual pixel circuitry 1700 at all. In embodiments, the pixel circuitry 1700 may provide a plurality of circuitry, such as for biasing, voltage biasing, current biasing, charge transfer, amplifier, reset, sample and hold, address logic, decoder logic, memory, TRAM cells, flash memory cells, gain, analog summing, analog-to-digital conversion, resistance bridges, or the like. In embodiments, the pixel circuitry 1700 may have a plurality of functions, such as for readout, sampling, correlated double sampling, sub-frame sampling, timing, integration, summing, gain control, automatic gain control, off-set adjustment, calibration, offset adjustment, memory storage, frame buffering, dark current subtraction, binning, or the like. In embodiments, the pixel circuitry 1700 may have electrical connections to other circuitry within the QDPC 100, such as wherein other circuitry located in at least one of a second quantum dot pixel 1800, column circuitry, row circuitry, circuitry within the functional components 2004 of the QDPC 100, or other features 2204 within the integrated system 2200 of the QDPC 100, or the like. The design flexibility associated with pixel circuitry 1700 may provide for a wide range of product improvements and technological innovations.

Pixel circuitry 1700 within the quantum dot pixel 1800 may take a plurality of forms, ranging from no circuitry at all, just interconnecting electrodes, to circuitry that provides functions such as biasing, resetting, buffering, sampling, binning, conversion, addressing, memory, and the like. In embodiments, electronics to condition or process the electrical signal may be located and configured in a plurality of ways. For instance, amplification of the signal may be performed at each pixel, group of pixels, at the end of each column or row, after the signal has been transferred off the array, just prior to when the signal is to be transferred off the chip 2000, or the like. In another instance, analog-to-digital conversion may be provided at each pixel, group of pixels, at the end of each column or row, within the chip's 2000 functional components 2004, after the signal has been transferred off the chip 2000, or the like. In addition, processing at any level may be performed in steps, where a portion of the processing is performed in one location and a second portion of the processing is performed in another location. An example may be the performing analog-to-digital conversion in two steps, say with an analog combining at the pixel 1800 and a higher-rate analog-to-digital conversion as a part of the chip's 2000 functional components 2004.

In embodiments, different electronic configurations may require different levels of post-processing, such as to compensate for the fact that every pixel has its own calibration level associated with each pixel's readout circuit. The QDPC 100 may be able to provide the readout circuitry at each pixel with calibration, gain-control, memory functions, and the like. Because of the QDPC's 100 highly integrated structure, circuitry at the quantum dot pixel 1800 and chip 2000 level may be available, which may enable the QDPC 100 to be an entire image sensor system on a chip. In some embodiments, the QDPC 100 may also be comprised of a quantum dot material 200 in combination with conventional semiconductor technologies, such as CCD and CMOS.

Pixel circuitry may be defined to include components beginning at the electrodes in contact with the quantum dot material 200 and ending when signals or information is transferred from the pixel to other processing facilities, such as the functional components 2004 of the underlying chip 200 or another quantum dot pixel 1800. Beginning at the electrodes on the quantum dot material 200, the signal is translated or read. In embodiments, the quantum dot material 200 may provide a change in current flow in response to radiation 1000. The quantum dot pixel 1800 may require bias circuitry 1700 in order to produce a readable signal. This signal in turn may then be amplified and selected for readout. One embodiment of a pixel circuit shown in FIG. 6*a* uses a reset-bias transistor 1802, amplifier transistor 1804, and column address transistor 1808. This three-transistor circuit configuration may also be referred to as a 3T circuit. Here, the reset-bias transistor 1802 connects the bias voltage 1702 to the photoconductive photovoltaic quantum dot material 200 when reset 1704 is asserted, thus resetting the electrical state of the quantum dot material 200. After reset 1704, the quantum dot material 200 may be exposed to radiation 1000, resulting in a change in the electrical state of the quantum dot material 200, in this instance a change in voltage leading into the gate of the amplifier 1804. This voltage is then boosted by the amplifier transistor 1804 and presented to the address selection transistor 1808, which then appears at the column output of the address selection transistor 1808 when selected. In some embodiments, additional circuitry may be added to the pixel circuit to help subtract out dark signal contributions. In other embodiments, adjustments for dark signal can be made after the signal is read out of the pixel circuit. In example, embodiments, additional circuitry may be added for film binning or circuit binning as described in connection with FIGS. 9 A-D below.

Figures 6A, 6B:
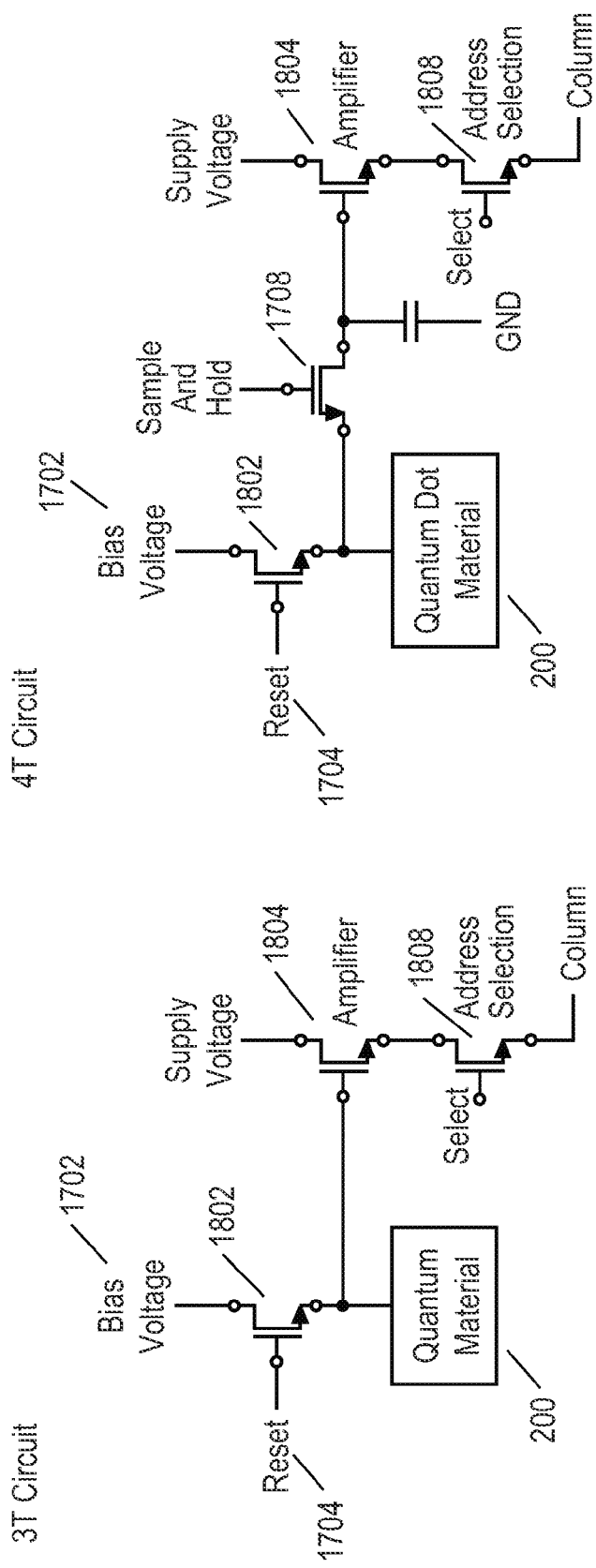
FIGS. 6a illustrates a 3T transistor configuration for interfacing with the quantum dot material.
FIG. 6b illustrates a 4T transistor configuration for interfacing with the quantum dot material.

Although additional circuitry may not be required for the low noise operation of the QDPC 100 in some embodiments, a fourth transistor circuit group may be added to increase sensitivity. FIG. 6*b* shows a QDPC 100 4T circuit, with the fourth transistor 1708 configured as a sample and hold. This configuration may also be referred to as a global shutter, where the entire pixel 1800 array may be sampled at the same time, but not necessarily at a fixed time, where the time of sampling may be a function of radiation 1000 conditions. The sample and hold may implement a correlated double sampling, where the signal value of each pixel is transferred to the output, and the output is reset to a reference value. The final value assigned to this pixel may be the difference between the reference value and the transferred signal. Correlated double sampling may yield the best representation of the true value associated with each pixel. From an electronics standpoint, there may be different methods for accomplishing this, such as digital, analog sample and hold, integration, dual slope, and the like. Differences in effectiveness may become evident with ultra low noise systems of less than 4 or 5 electrons, depending on the overall design of the system. In an embodiment, two sample and holds may be used, holding two values in order to utilize the difference between them. In addition, the QDPC 4T circuit may also have a separate pixel reset, which may be distinct from the circuit reset. The two resets may be used simultaneously, or at different times. In embodiments, the QDPC 100 circuits may have varied voltages, time profiles, lengths of reset times, sampling schemes, and the like, that my enable innovative product solutions not capable with conventional designs. In example, embodiments, additional circuitry may be added for film binning or circuit binning as described in connection with FIGS. 9 A-D below (except that the 4T structure similar to FIG. 6*b* would be used instead of the 3T structure shown in FIG. 9 D).

In embodiments, the biasing of the photodetector may be time invariant or time varying. Varying space and time may reduce cross-talk, and enable a shrinking the quantum dot pixel 1800 to a smaller dimension, and require connections between quantum dot pixels 1800. Biasing could be implemented by grounding at the corner of a pixel 1800 and dots in the middle. Biasing may occur only when performing a read, enabling either no field on adjacent pixels 1800, forcing the same bias on adjacent pixels 1800, reading odd columns first then the even columns, and the like. Electrodes and/or biasing may also be shared between pixels 1800. Biasing may be implemented as a voltage source or as a current source. Voltage may be applied across a number of pixels, but then sensed individually, or applied as a single large bias across a string of pixels 1800 on a diagonal. The current source may drive a current down a row, then read it off across the column. This may increase the level of current involved, which may decrease read noise levels.

In embodiments, configuration of the field, by using a biasing scheme or configuration of voltage bias, may produce isolation between pixels. Currently may flow in each pixel so that only electron-hole pairs generated in that volume of pixel flow within that pixel. This may allow electrostatically implemented inter-pixel isolation and cross-talk reduction, without physical separation. This could break the linkage between physical isolation and cross-talk reduction.

In embodiments, the pixel circuitry 1700 may include circuitry for pixel readout. Pixel readout may involve circuitry that reads the signal from the quantum dot material 200 and transfers the signal to other components 1900, chip functional components 2004, to the other features 2204 of the integrated system 2200, or to other off chip components. Pixel readout circuitry may include quantum dot material 200 interface circuitry, such as the 3T and 4T circuits shown in FIGS. 6a and 6b for example and circuitry for color binning, such as the circuitry shown in FIGS. 9 A-C below. Pixel readout may involve different ways to readout the pixel signal, ways to transform the pixel signal, voltages applied, and the like. Pixel readout may require a number of metal contacts with the quantum dot material 200, such as 2, 3, 4, 20, or the like. These electrical contacts may be custom configured for size, degree of barrier, capacitance, and the like, and may involve other electrical components such a Schottky contact. Pixel readout time may be related to how long the radiation 1000-induced electron-hole pair lasts, such as for milliseconds or microseconds. In embodiments, this time my be associated with quantum dot material 200 process steps, such as changing the persistence, gain, dynamic range, noise efficiency, and the like.

Figure 5N:
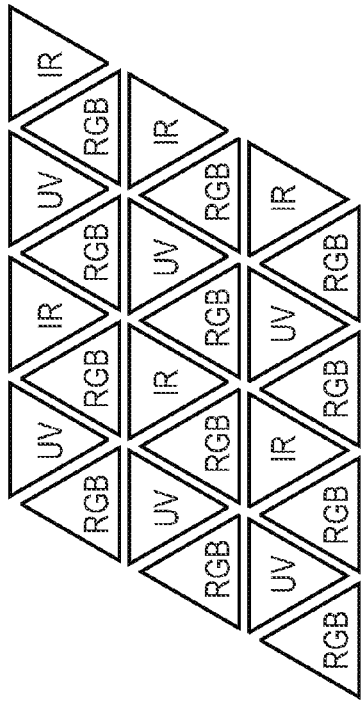
FIG. 5n shows pixel layouts with different shapes, such as triangles.
Figure 5P:
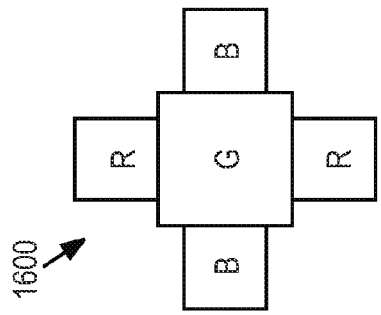
FIG. 5p shows an example of a pixel layout.
Figure 5M:
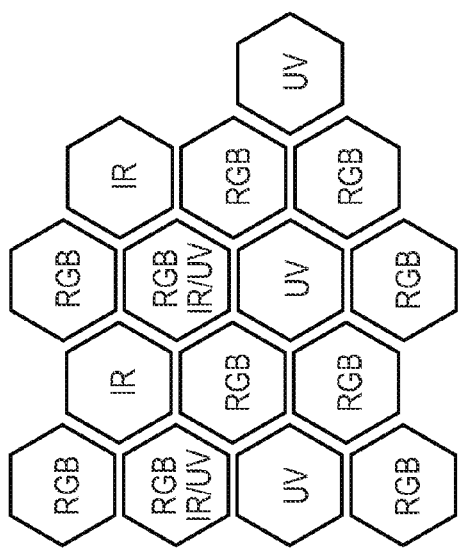
FIG. 5m shows pixel layouts with different shapes, such as hexagons.
Figure 5O:
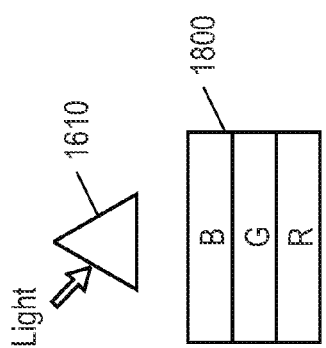
FIG. 5o shows a quantum dot pixel, such as a multi-spectral quantum dot pixel or other pixel, provided in association with an optical element.

The quantum dot pixels 1800 described herein can be arranged in a wide variety of pixel layouts 1600. Referring to FIGS. 5a-p for example, a conventional pixel layout 1600, such as the Bayer filter layout 1602, includes groupings of pixels disposed in a plane, which different pixels are sensitive to radiation 1000 of different colors. In conventional image sensors, such as those used in most consumer digital cameras, pixels are rendered sensitive to different colors of radiation 1000 by the use of color filters that are disposed on top of an underlying photodetector, so that the photodetector generates a signal in response to radiation 1000 of a particular range of frequencies, or color. In this configuration, mosaic of different color pixels is referred to often as a color filter array, or color filter mosaic. Although different patterns can be used, the most typical pattern is the Bayer filter pattern 1602 shown in FIG. 5a, where two green pixels, one red pixel and one blue pixel are used, with the green pixels (often referred to as the luminance-sensitive elements) positioned on one diagonal of a square and the red and blue pixels (often referred to as the chrominance-sensitive elements) are positioned on the other diagonal. The use of a second green pixel is used to mimic the human eye's sensitivity to green light. Since the raw output of a sensor array in the Bayer pattern consists of a pattern of signals, each of which corresponds to only one color of light, demosaicing algorithms are used to interpolate red, green and blue values for each point. Different algorithms result in varying quality of the end images. Algorithms may be applied by computing elements on a camera or by separate image processing systems located outside the camera. Quantum dot pixels may be laid out in a traditional color filter system pattern such as the Bayer RGB pattern; however, other patterns may also be used that are better suited to transmitting a greater amount of light, such as Cyan, Magenta, Yellow (CMY). Red, Green, Blue (RGB) color filter systems are generally known to absorb more light than a CMY system. More advanced systems such as RGB Cyan or RGB Clear can also be used in conjunction with Quantum dot pixels.

In one embodiment, the quantum dot pixels 1800 described herein are configured in a mosaic that imitates the Bayer pattern 1602; however, rather than using a color filter, the quantum dot pixels 1800 can be configured to respond to radiation 1000 of a selected color or group of colors, without the use of color filters. Thus, a Bayer pattern 1602 under an embodiment includes a set of green-sensitive, red-sensitive and blue-sensitive quantum dot pixels 1800. Because, in embodiments, no filter is used to filter out different colors of radiation 1000, the amount of radiation 1000 seen by each pixel is much higher.

Color Filters and Pixel Patterns for Binning.

FIGS. 8 A-C illustrate color pixel patterns, binning sites and binned patterns that may be used in example embodiments. The first column of FIGS. 8 A-C shows color subpixel patterns that can be used in example embodiments. The first column shows the pixel pattern in high resolution mode. In this mode, a bias electrode separates each color subpixel. The bias electrode may be provided by a grid electrode or multiple grid electrodes that provide a common bias for the subpixel elements. A second pixel electrode inside each subpixel region may be used to collect a signal from each subpixel region that can be read by pixel circuitry. The pixel circuitry may be formed on an integrated circuit device under the photosensitive material. In example embodiments, the color patterns shown in the first column of FIGS. 8 A-C are formed on color filters that are placed over the photosensitive material. For example, pixel circuitry may be formed on a CMOS integrated circuit device. Metal contacts from the CMOS circuitry may be connected to the electrodes and a layer of photosensitive material may be formed over the electrodes. A color filter with the desired color pattern shown in the first column of FIGS. 8 A-C may be positioned over the photosensitive material. In this example, the photosensitive material may be a continuous film of interconnected nanocrystals. The photosensitive material may be sensitive to each of the colors of light to be detected, but the color filter only allows the desired color of light to reach each subpixel region of the photosensitive material. In alternative embodiments, subpixels may also be provided for other wavebands such as UV and/or IR subpixels or Y, U, V color subpixels instead of or in addition to R, G, B subpixels as shown in FIGS. 8 A-C.

In other embodiments, different photosensitive material sensitive to the respective waveband may be used for each subpixel area and a color filter may not be needed in some embodiments. For example, in some embodiments, vertical layers of photosensitive material may be used. In addition, other embodiments may use different colors or color patterns. For example, Cyan, Yellow and Magenta color subpixels or combinations of Red, Green, Blue and Cyan, Yellow and Magenta may be used. In addition, other embodiments may use different electrode patterns, such as lateral electrodes, interdigitated electrodes, vertically stacked electrodes or other electrode patterns as described above.

Figure 8A:
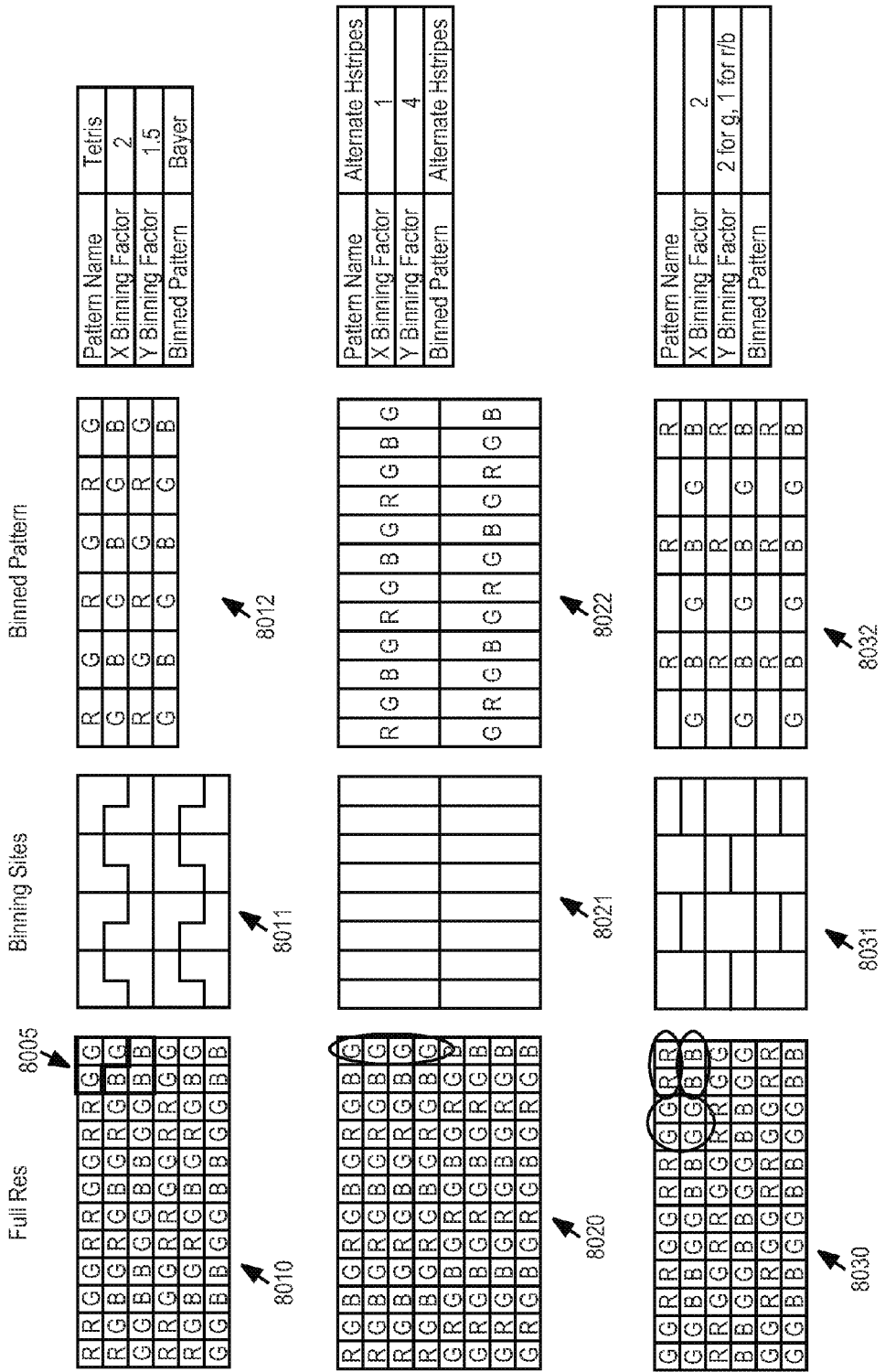
FIGS. 8 A-C illustrate color pixel patterns, binning sites and binned patterns that may be used in example embodiments.

As shown in the first column of FIG. 8A for array 8010, the color subpixel regions on the color filter may be arranged so that each pixel in high resolution mode has a red, blue and two green subpixels similar to a Bayer pattern. However, the position of the subpixels for adjacent pixels are arranged so that multiple subpixels for the same color are adjacent to one another. For example, three red, green or blue subpixels from adjacent pixels may be combined in an "L" shape, as shown by the circled set of three green subpixels at 8005 in the upper right corner of array 8010. The binned subpixels include two adjacent subpixels from one row and a subpixel from an adjacent row that is in the same column as one of those two subpixels. It will be apparent that FIGS. 8 A-C only show a portion of the whole pixel array and the pattern would continue for other pixels. For example, an array may include 2, 4, 6, 8 or more megapixels.

For binning in array 8010, some of the electrode segments in the electrode grid are switched off. They are disconnected from the bias used in the high resolution mode. The remaining electrode segments form "L" shaped patterns as shown at 8011 that remain connected to the bias. Each "L" shaped region corresponds to three color subpixels for the same color that are binned together from three adjacent pixels (such as the three green subpixels shown at 8005). One or more pixel electrodes within these regions may be used to read a signal from the binned area into the pixel circuit. For example, one or more of the pixel electrodes used to read signals from each subpixel in full resolution mode (which may be, for example, a square electrode in each subpixel region that is connected by a via to the pixel circuit) may be used to read the signal for the binned "L" shaped region. The third column of FIG. 8A shows the binned pixel pattern at 8012. This pattern is similar to a Bayer pattern with each color component of the binned super pixel corresponding to one of the "L" shaped regions formed by the active electrode segments. As described in the fourth column of FIG. 8A, this pattern provides 3-to-1 binning, with a binning factor in the X (horizontal) direction of 2 and a binning factor in the Y (vertical) direction of 1.5.

Array 8020 in the second row of FIG. 8A shows another color filter pattern that can be used for binning. The pixels are arranged so columns of four adjacent subpixels of the same color are formed. For binning, some of the electrode segments are disconnected, so the active electrode segments form the pattern shown at 8021. This results in super pixels with elongated color elements that alternate red, green, blue, green as shown at 8022. Each color element is a vertical stripe that is one subpixel wide and four subpixels high. As described in the fourth column of FIG. 8A, this pattern provides a binning factor in the X (horizontal) direction of 1 and a binning factor in the Y (vertical) direction of 4.

Array 8030 in the third row of FIG. 8A shows another color filter pattern that can be used for binning. The pixels are arranged so four green subpixels are adjacent to one another (two adjacent green subpixels in one row aligned in the same columns as two green subpixels in an adjacent row). Each pixel may use two green subpixels, one red subpixel and one blue subpixel similar to a Bayer pattern, but the subpixels are arranged so four adjacent subpixel regions for green are next to each other as shown at 8030. In addition, two red subpixels and two blue subpixels from adjacent pixels are positioned next to one another. For binning, some of the electrode segments are disconnected, so the active electrode segments form the pattern shown at 8031. This results in super pixels as shown at 8032 with four green subpixels binned together to provide the green color element of the super pixel, two red subpixels binned together to provide the red color element for the super pixel and two blue subpixels binned together to provide the blue color element for the super pixel. As described in the fourth column of FIG. 80A, this pattern provides a binning factor in the X (horizontal) direction of 2 and a binning factor in the Y (vertical) direction of 2 for green, 1 for red and 1 for blue.

Figure 8B:
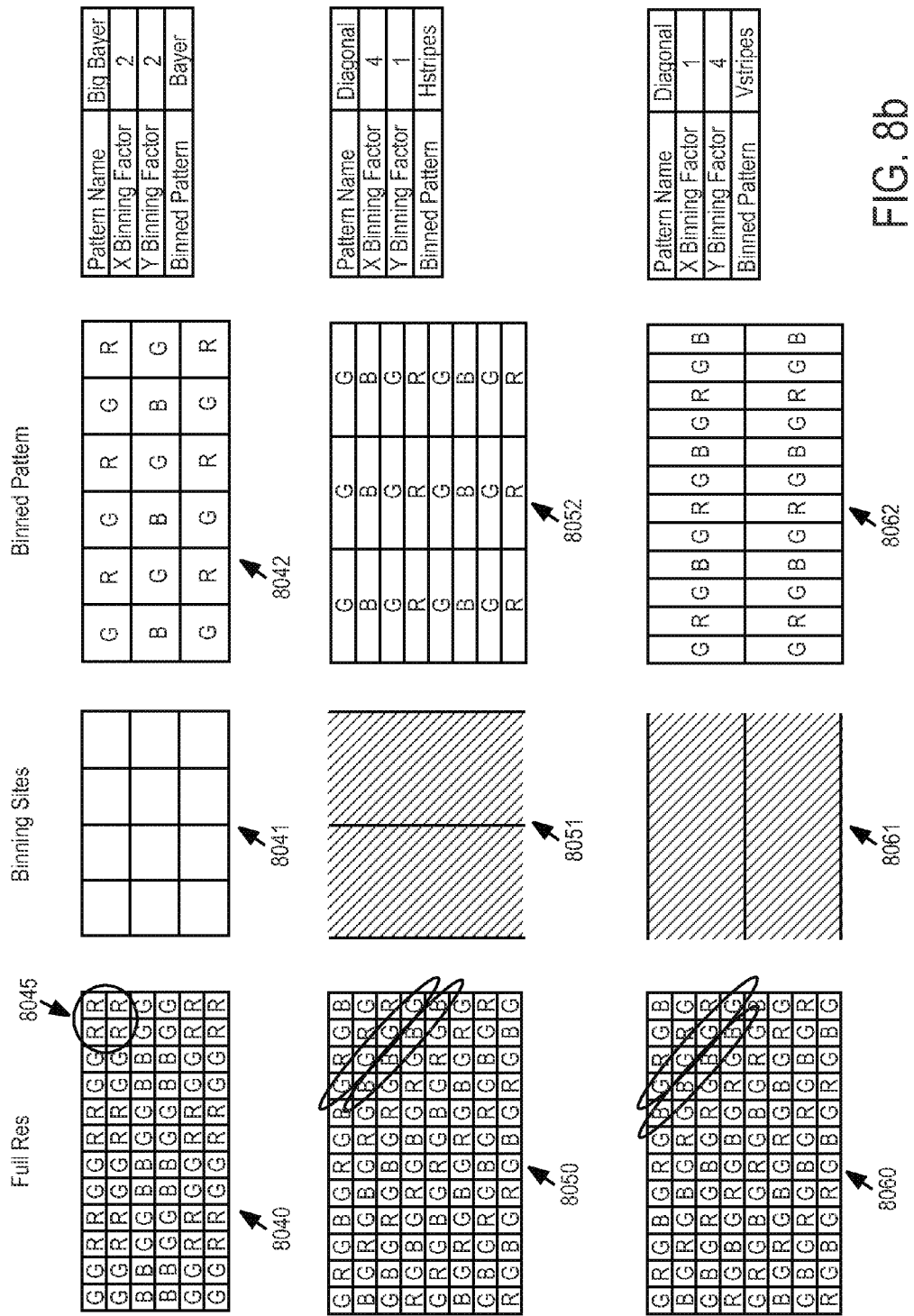

Array 8040 in the first row of FIG. 8B shows another color filter pattern that can be used for binning. Each pixel may use two green subpixels, one red subpixel and one blue subpixel similar to a Bayer pattern, but the subpixels are arranged so four subpixels from four adjacent pixel regions are next to each other for each color as shown at 8040. For binning, some of the electrode segments are disconnected, so the active electrode segments form the pattern shown at 8041. As shown at 8041, this results in regions that are the size of a 2×2 block of subpixels. This results in super pixels with color elements in a Bayer pattern (with two green color elements, one red color element and one blue color element) as shown at 8042. Each color element corresponds to the area of four subpixels. As described in the fourth column of FIG. 8B, this pattern provides 4-to-1 binning, with a binning factor in the X (horizontal) direction of 2 and a binning factor in the Y (vertical) direction of 2.

Array 8050 in the second row of FIG. 8B shows another color filter pattern that can be used for binning. The pixels are arranged in a pattern similar to a Bayer pattern with each pixel having two green subpixels, one red subpixel and one blue subpixel, but the subpixels are arranged so subpixels from adjacent pixel regions are diagonally aligned (see, for example, circled regions in array 8050), For binning, some of the electrode segments are disconnected, so the active electrode segments form the pattern shown at 8051. As shown at 8051, this results in diagonally striped regions that correspond to a set of four diagonally aligned subpixels. In this example embodiment, the electrodes for full resolution may have slightly slanted, oval or other irregularly shaped electrodes or electrode segments so that electrode segments can be selected for binning that approximate the regions shown at 8051. This results in super pixels with color elements corresponding to four diagonal subpixel regions as shown at 8052. As described in the fourth column of FIG. 8B, this pattern provides a binning factor in the X (horizontal) direction of 4 and a binning factor in the Y (vertical) direction of 1.

Array 8060 in the third row of FIG. 8B shows another color filter pattern that can be used for binning. The pixels are arranged in a pattern similar to a Bayer pattern with each pixel having two green subpixels, one red subpixel and one blue subpixel, but the subpixels are arranged so subpixels from adjacent pixel regions are diagonally aligned (see, for example, the circled regions in array 8060). For binning, some of the electrode segments are disconnected, so the active electrode segments form the pattern shown at 8061. As shown at 8061, this results in diagonally striped regions that correspond to a set of four diagonally aligned subpixels. In this example embodiment, the electrodes for full resolution may have slightly slanted, oval or other irregularly shaped electrodes or electrode segments so that electrode segments can be selected for binning that approximate the regions shown at 8061. This is similar to the patterns used for array 8050, but the pixels are binned into super pixels differently. Instead of using the binned diagonal regions to represent horizontally elongated color elements, the binned regions are used to represent vertically elongated color elements for each super pixel as shown at 8062. As described in the fourth column of FIG. 8B, this pattern provides a binning factor in the X (horizontal) direction of 1 and a binning factor in the Y (vertical) direction of 4.

Figure 8C:
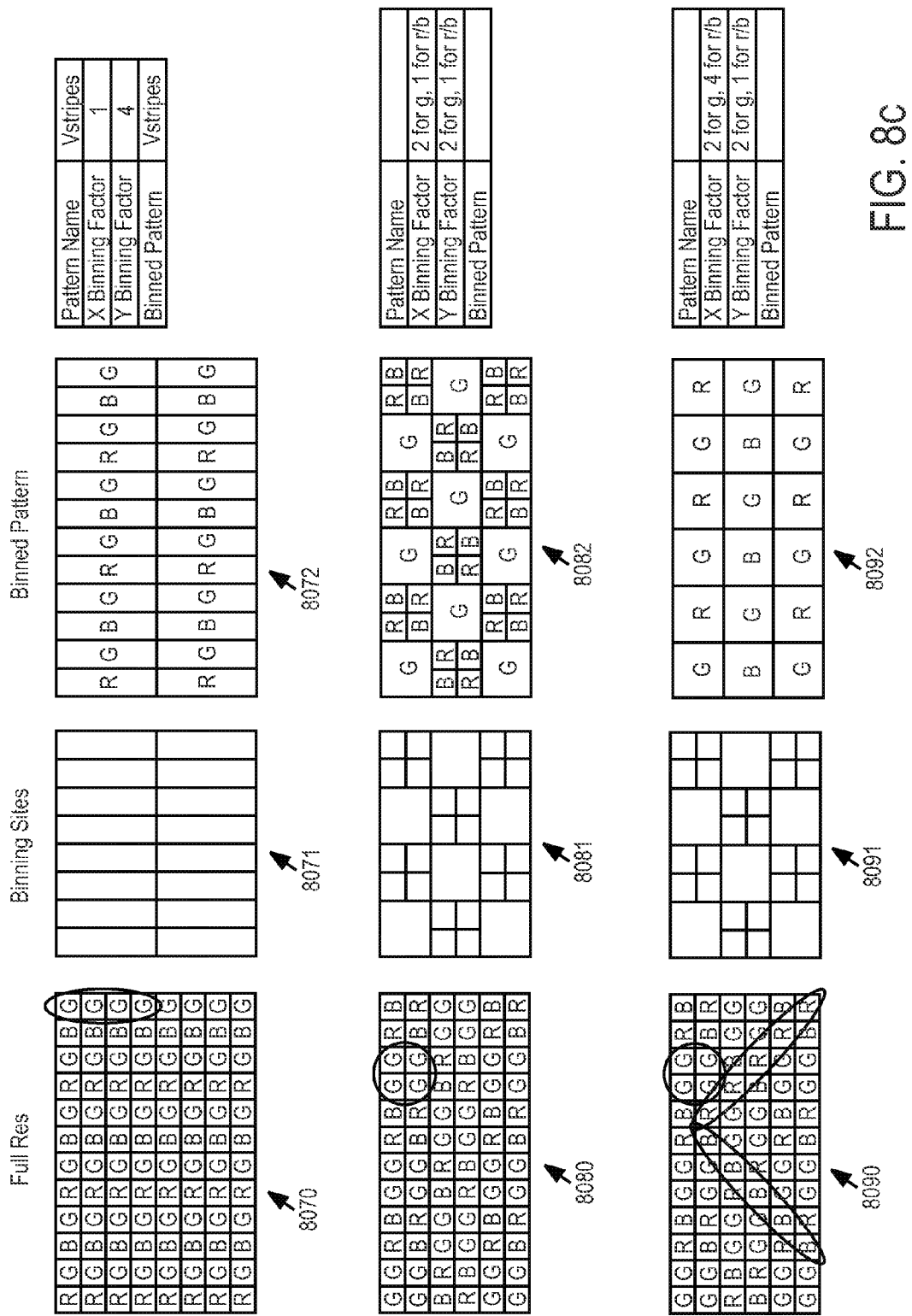

Array 8070 in the first row of FIG. 8C shows another color filter pattern that can be used for binning. The pixels are arranged so columns of subpixels of the same color are formed. For binning, some of the electrode segments are disconnected, so the active electrode segments form the pattern shown at 8021. This results in super pixels with elongated color elements that alternate red, green, blue, green as shown at 8022. Each color element is a vertical stripe that is one subpixel wide and four subpixels high. As described in the fourth column of FIG. 8C, this pattern provides a binning factor in the X (horizontal) direction of 1 and a binning factor in the Y (vertical) direction of 4.

Array 8080 in the second row of FIG. 8C shows another color filter pattern that can be used for binning. The pixels are arranged so four green subpixels are adjacent to one another (two adjacent green subpixels in one row aligned in the same columns as two green subpixels in an adjacent row). Each pixel may use two green subpixels, one red subpixel and one blue subpixel similar to a Bayer pattern, but the subpixels are arranged so four adjacent subpixel regions for green are next to each other as shown at 8030. In this example, the red and blue subpixels alternate and are not binned in the film. They can be binned together using circuit binning or digital binning to combine two red subpixels and two blue subpixels for the color elements of the superpixel or they can be maintained as separate subpixel signals. For binning, some of the electrode segments are disconnected, so the active electrode segments form the pattern shown at 8081. This results in super pixels as shown at 8082 with four green subpixels binned together to provide the green color element of the super pixel. The red and blue subpixels remain separated. As described in the fourth column of FIG. 8C, this pattern provides a binning factor in the X (horizontal) direction of 2 for green, 1 for red and 1 for blue and a binning factor in the Y (vertical) direction of 2 for green, 1 for red and 1 for blue.

Array 8090 in the third row of FIG. 8C shows another color filter pattern that can be used for binning. The pixels are arranged so four green subpixels are adjacent to one another and red and blue pixels are aligned diagonally. The four green subpixels are binned and groups of diagonal red and blue subpixels can be binned as well. For binning, some of the electrode segments are disconnected to provide for binning these groups of subpixels. This results in super pixels as shown at 8092 with four subpixels binned together for each color element. As described in the fourth column of FIG. 8C, this pattern provides a binning factor in the X (horizontal) direction of 2 for green, 4 for red and 4 for blue and a binning factor in the Y (vertical) direction of 2 for green, 1 for red and 1 for blue.

FIGS. 9A-D illustrate pixel circuitry for high resolution, film binning and circuit binning modes in example embodiments. The pixel circuit may be formed on an integrated circuit device under the photosensitive material in example embodiments. The parts of circuits 9 A, B and C are numbered 1, 2, 3 and 4 as well as with reference numbers for particular circuit elements. Part 1 of each circuit is generally for charge collection, part 2 is generally for pixel readout (charge to voltage conversion), part 3 is generally for column storage and part 4 is for column readout. The orange circles (parts 1, 2, 3 and 4 in FIG. 9A; part 1 in FIG. 9B and parts 1 and 2 in FIG. 9C) are separate operations that occur for each subpixel. The green circles (parts 2, 3 and 4 in FIG. 9B and parts 3 and 4 in FIG. 9C) are grouped operations that apply to binned signals. The black arrow in each of FIGS. 9A-C represents the read out path for the signal. The read out path is connected to a pixel read out circuit, such as the 3T or 4T circuits described above. An example of a 3T circuit that may be used is shown in FIG. 9D. The circuit in FIG. 9D operates similarly to the circuit in FIG. 6a, except that a binned signal may be provided to the node shown with an orange circle in FIG. 9D for binning modes.

As shown at 9000, high resolution mode may use a read out for each smallest patterned subpixel region. As shown at part 1 of circuit 9000, charge flows across the optically sensitive material for a subpixel region 9014 during the integration period. In high resolution mode, the grid electrodes are biased for full resolution mode as shown in one of the configurations in the first column of FIGS. 8 A-C. The pixel electrode 9016 collects charge from within the subpixel region during the integration period. This electrode may be connected to the pixel circuitry through the metal interconnect and via of the integrated circuit device on which the pixel circuitry is formed. The transistor 9018 shown at part 2 of circuit 9010 is turned on in full resolution mode. This transistor 9018 provides a switch that can be selectively turned off for some of the subpixels during binning. As shown at part 3 of circuit 9000, a charge store 9022 is used for integrating a signal from the subpixel element. This charge store 9022 may be provided by parasitic capacitance of a transistor or may be a separate capacitive element. As shown by the arrows 9020 in part 4 of circuit 9000, the signal may be read out of the circuit after the integration period. In an example embodiment, the capacitance for the charge store for each subpixel element may be the same.

The circuit at 9100 in FIG. 9B illustrates the pixel circuitry in film binning mode. In film binning mode, the grid electrodes are biased as shown in one of the configurations in the second column of FIGS. 8 A-C, with portions of the electrode segments disconnected to allow for binning. In this example, four subpixel regions are integrated to a single common charge store. The four pixel electrodes may correspond to the pixel electrodes used to read out four adjacent subpixels of the same color during full resolution mode in one of the configurations shown in FIGS. 8A-C. For example, for array 8040 in FIG. 8B, there may be a pixel electrode for each of the red subpixels circled at 8045 in FIG. 8B. As shown in the second column of FIG. 8B at 8041, this region is binned into a single red color element for a super pixel. The four pixel electrodes used to read out the four circled red subpixels may now be used to read out the signal from the binned red color element shown at 8045 in FIG. 8B. As shown in the circuit at 9100 in FIG. 9B, the signal from these four pixel electrodes may be read out to one of the charge stores 9022 during binning. For example, as shown in circuit 9100, the switches 9018 in part 2 of the circuit may be opened for three out of the four charge stores 9022 that were used to read subpixels in full resolution mode. In an example embodiment, the charge store used for binning may correspond to one of the charge stores 9022 used to read out an individual sub-pixel in full resolution mode. In an example embodiment, the same capacitance may be used for this charge store. An additional capacitive element does not need to be added for binning. By integrating a signal from a larger area of the photosensitive material to a charge store with the same capacitance, higher sensitivity can be obtained. If a higher capacitance is used for the charge store for binning, the conversion gain/capacitance drops thereby reducing sensitivity. However, a higher capacitance charge store may be used for binning in some embodiments to provide higher dynamic range (since more charge can be integrated with a higher capacitance).

The circuit at 9200 in FIG. 9C illustrates a pixel circuit that may be used for circuit binning. In this circuit, the switches 9218 in part 2 of the circuit may be used to select between integration to a common charge store 9221 or integration to individual charge stores 9220. In this example, the four subpixels being combined may be from four subpixels of the same color from different pixels, even if the subpixels are not adjacent to one another. The lines of the pixel circuit may be routed under the optically sensitive material to connect the desired subpixels for circuit binning. For example, these signals may be routed in the metals layers of a CMOS integrated circuit device and may pass under adjacent subpixels of a different color in order to combine signals from a remotely positioned subpixel of the same color. For high resolution mode, this circuit may be used by turning on one of the switches 9218 at a time and reading each subpixel from line 9222 separately in a serial fashion. For circuit binning, all four switches 9218 are turned on and the binned signal from all four subpixels is read out at the same time.

In some embodiments, the capacitance for the charge store or multiple charge stores used for binning may be greater than the capacitance used in film binning mode and/or full resolution mode. For example, the common charge store in circuit 9221 may have a larger capacitance than the individual charge stores used for each subpixel element in full resolution mode. As a result, a mode with higher dynamic range can be provided by using circuit or film binning with a larger capacitance for the charge store during binning.

These are examples only and other circuits may be used for full resolution, film binning and circuit binning in other embodiments.

Some embodiments may combine multiple modes of binning in a singe image sensor. For example, circuit 9000 may be used in full resolution mode where each subpixel is read out separately. Circuit 9200 may also be used for a high resolution mode where individual subpixels are read out serially as described above. A second mode may be provided with film binning by switching the pixel circuitry to operate as shown at 9100. This provides a higher sensitivity mode that can be used for low light conditions. A third mode may be provided that uses the circuit as shown at 9000 or 9200, but with a switch selected that combines the read out lines for four subpixels of the same color. This provides binning with a higher capacitance for the charge store and can be used to provide a mode with higher dynamic range. This mode could use either film binning or circuit binning. In yet another mode, circuit binning may be used to combine super pixel color elements that are read out by circuits operating in the film binning mode shown at 9100. Any of the above binning modes may also be used for a video mode, where the decrease in resolution may be acceptable and provide lower storage requirements. In addition, if the smallest patterned subpixel is very small (for example, less than about 2×2 microns, or less than 1.5×1.5 microns or less than 1×1 microns), the loss in resolution may not be significantly perceived by a person viewing the resulting image or video relative to full resolution mode. Any combination of these modes may be combined in a single image sensor array for use in a camera on a cell phone for example.

Figure 10:
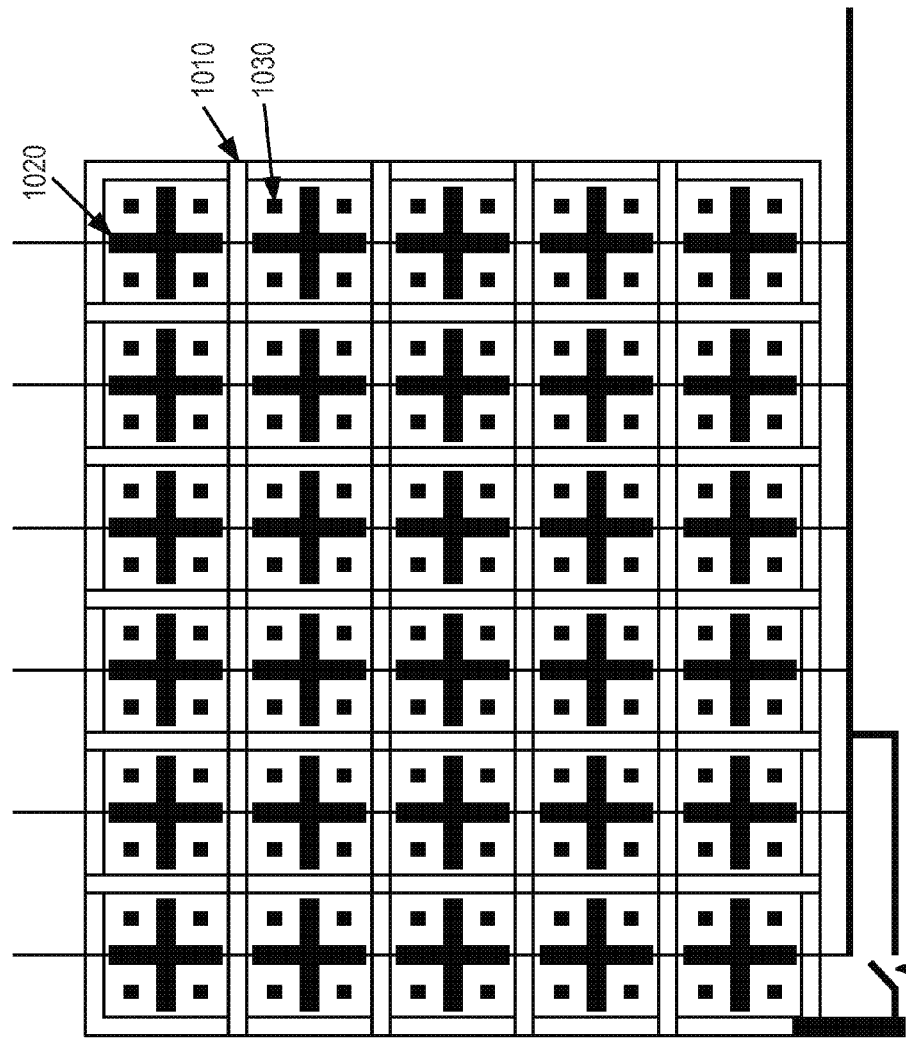
FIG. 10 illustrates interleaved electrode grids that may be used for binning in an example embodiment.

FIG. 10 illustrates interleaved electrode grids that may be used for 4-to-1 binning in an example embodiment. As shown in FIG. 10, one grid 1010 may form a boundary around 4×4 subpixel element blocks. These blocks may correspond to the regions to be binned in the array shown at 8041 in FIG. 8B. A second set of "+" or cross-shaped electrodes 1020 may separate these blocks into four separate subpixel regions in full resolution mode. A switch (shown as "Film Binning Enable") may be used to selectively disconnect the second set of electrodes for binning. This may be coordinated with the switches in the pixel circuit shown in FIGS. 9A and B to provide binning of 4×4 regions into a common charge store (as shown at 9200 in FIG. 9B). The individual square dots 1030 in the middle of each subpixel region in FIG. 10 show the pixel electrodes used to read the signal from the individual subpixels. In film binning mode, all four pixel electrodes for the 4×4 binned region are connected to a common charge store as shown at 9200 in FIG. 9B.

Figure 11:
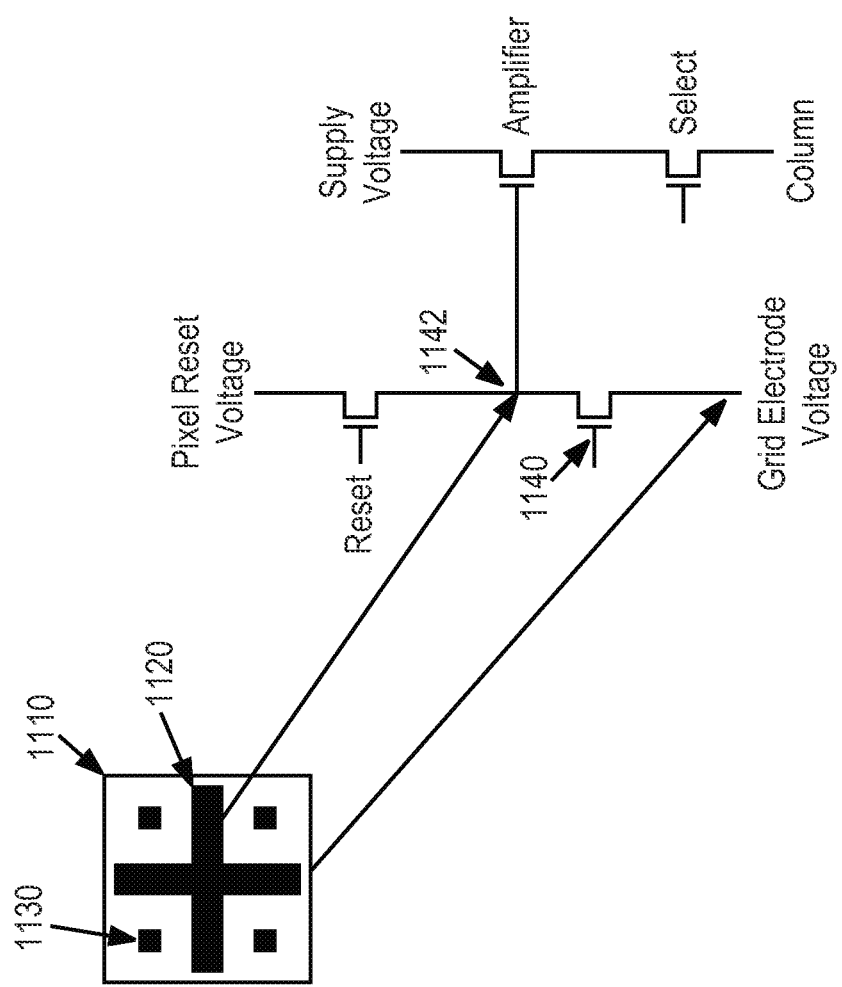
FIG. 11 illustrates an electrode layout and pixel circuit according to an example embodiment.

FIG. 11 shows another example embodiment of electrode grids and a pixel circuit for film binning. The pixel circuitry shown in FIG. 11 corresponds to the portion of the pixel circuit shown in FIG. 9D, but the electrodes are connected to the bias differently. As shown in FIG. 11, the outer grid 1110 enclosing the binned region may be connected to a bias grid electrode voltage. The second set of "+" or cross-shaped grids at 1120 may be connected to the same bias in full resolution mode to separate the subpixel regions. In this mode, switch 1140 is on and node 1142 is connected to the bias grid electrode voltage. In film binning mode, the pixel electrodes may be disconnected and the "+" shaped grids at 1120 may be used as pixel electrodes for the binned region. The "+" shaped pixel electrodes collect charge to a capacitance/charge store at node 1142. Switch 1140 if off, so node 1142 is isolated from the bias grid electrode voltage and can be used for reading the binned signal instead. This allow a larger symmetric pixel electrode to be used in binning mode instead of one or more of the four separate pixel electrodes used in full resolution mode.

Figure 12A:
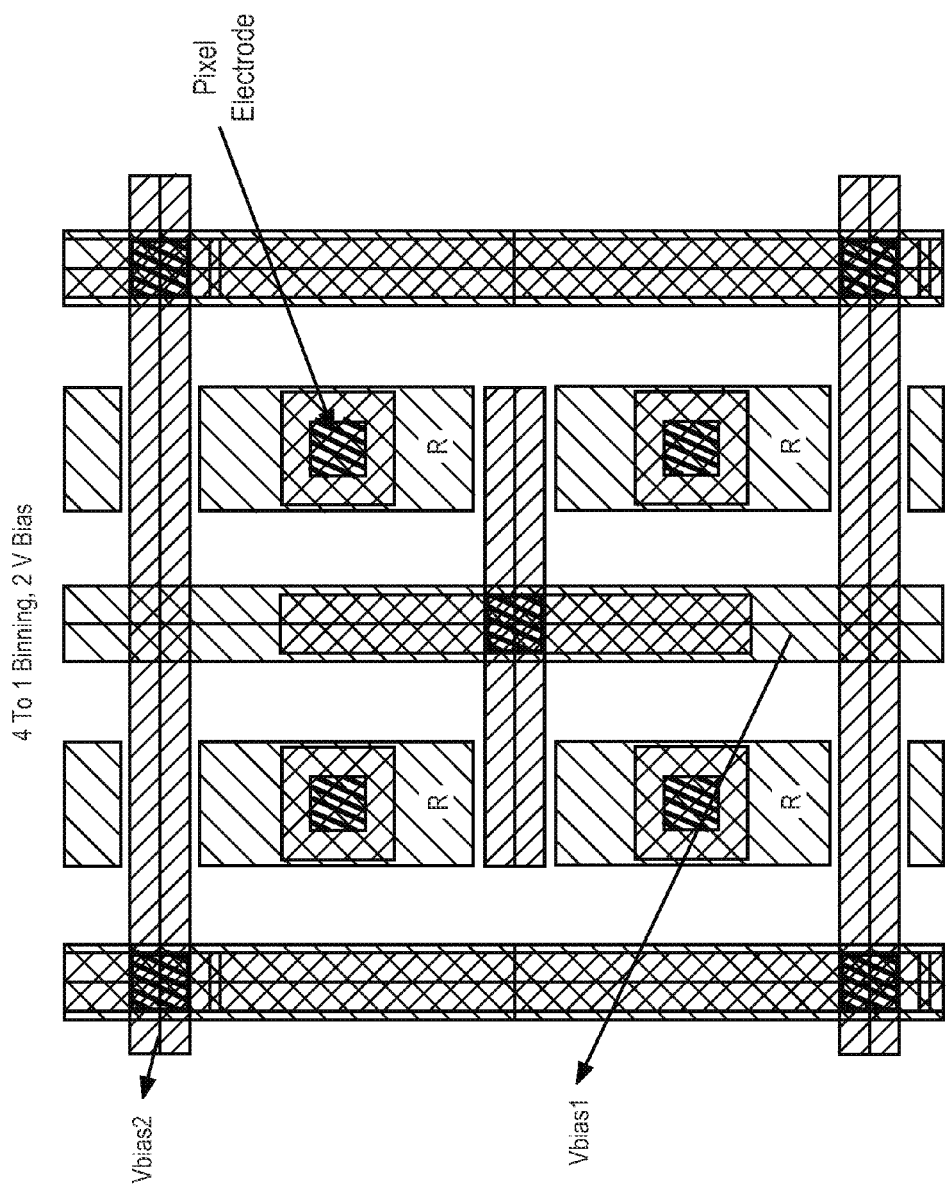
FIG. 12A illustrates an electrode layout for 4-to-1 binning according to an example embodiment.

FIG. 12A illustrates an electrode layout for 4-to-1 binning according to an example embodiment. As shown in FIG. 12A, an outer electrode grid is connected to Vbias2 and an inner electrode grid structure is connected to Vbias1. A switch may be used to connect these two electrodes to a common bias during full resolution mode. The switch may be opened to disconnect the inner "+" shaped electrode structure during binning. The pixel electrodes are connected to the pixel circuit by vias. In one example, this circuit has 1.1 micron square subpixels and provides 4-to-1 binning. For a 2 megapixel array, the size is about 2090 microns horizontally and 1430 microns vertically. Another example circuit has 1.4 micron square subpixels and provides 4-to-1 binning. This arrangement may be used to provide a 2 megapixel array for an image sensor array having a size of about 2660 microns horizontally and 1820 microns vertically. Arrays with 4, 8 or more 1.1 micron square or 1.4 micron square megapixels may be provided with proportional changes in the size of the array in example embodiments.

Figure 12B:
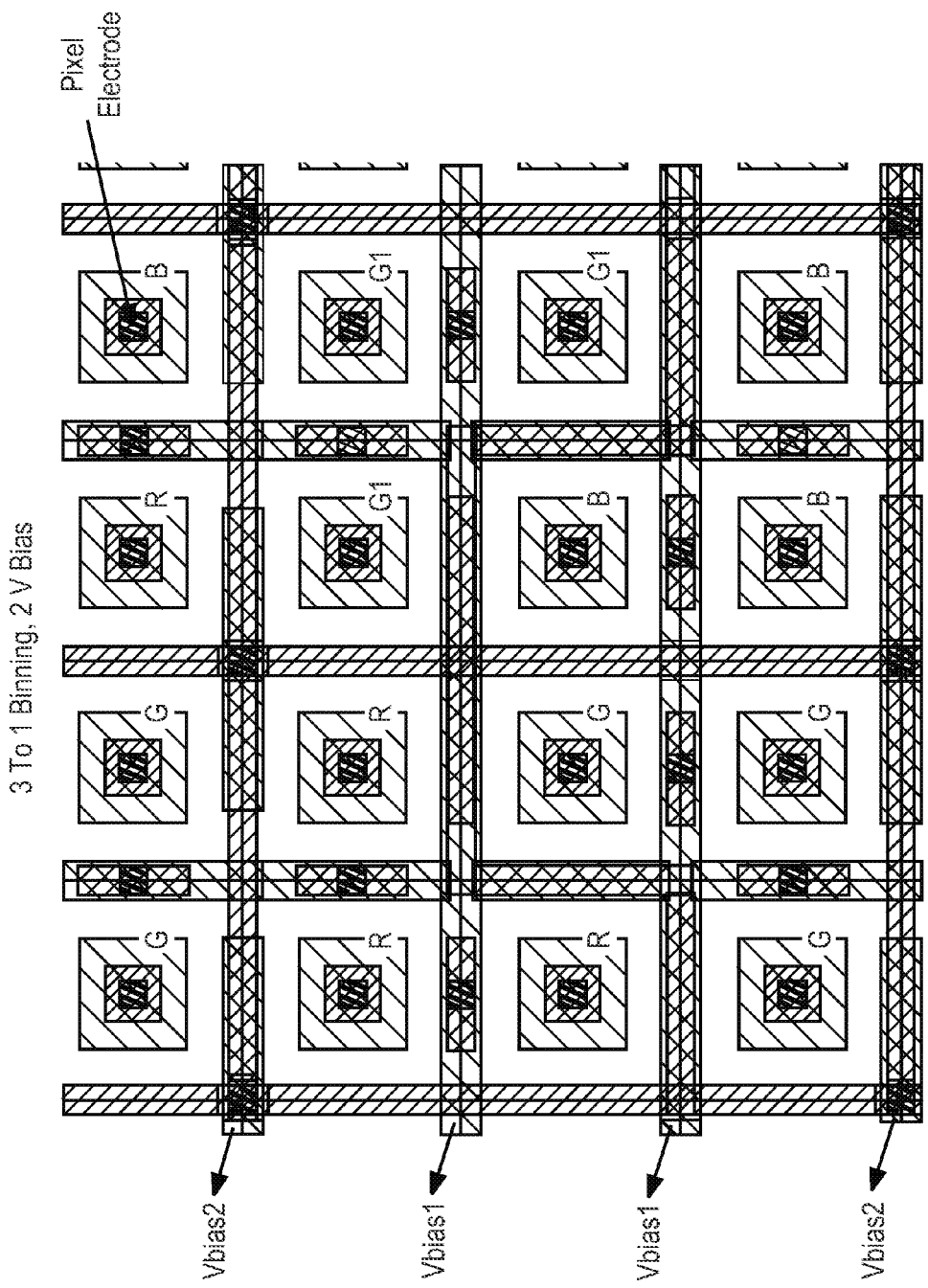
FIG. 12B illustrates an electrode layout for 3-to-1 binning according to an example embodiment.

FIG. 12B illustrates an example electrode layout for 3-to-1 binning similar to the arrangement shown at 8010 in FIG. 8A. As shown in FIG. 12B, an outer electrode grid is connected to Vbias2 and an inner electrode grid structure is connected to Vbias1. A switch may be used to connect these two electrodes to a common bias or ground during full resolution mode. The switch may be opened to disconnect the inner electrode structure during binning. This leaves only the outer grid (connected to Vbias2 active) and provides "L" shaped binning regions where three subpixels of the same color are binned together (similar to the pattern shown at 8011 in FIG. 8A). The pixel electrodes are connected to the pixel circuit by vias. Example embodiments may use 1.1 micron square or 1.4 micron square pixels and have 2, 4, 8 or more megapixel arrays with sizes as described in connection with FIG. 12A above.

Other embodiments may be used to provide film binning as well. For example, vertical layers of optically sensitive material may be used to provide a vertical pixel arrangement as shown above in FIGS. 5d and 5e. Each vertical stack has layers sensitive to different colors or ranges of radiation. The stacks may be separated by vertical grid electrodes that separate one pixel from an adjacent pixel for reading individual pixel regions of each layer in full resolution mode. Pixel electrodes for each subpixel may read a signal from each layer in the stack for a different color or range of radiation. Film binning may be provided by disconnecting segments of the vertical grid separating these stacks, so the layers from adjacent pixels are no longer separated. The pixel electrodes for each layer can then read a signal from a larger area of the optically sensitive material corresponding to subpixels of the same color wavebands (or UV or IR wavebands) from adjacent subpixels.

While example embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An image sensor, comprising:
   a semiconductor substrate;
   a substantially continuous optically sensitive layer overlying the semiconductor substrate;
   a first electrode in communication with a first pixel region of the substantially continuous optically sensitive layer;
   a second electrode in communication with a second pixel region of the substantially continuous optically sensitive layer;
   a third electrode in communication with a third pixel region of the substantially continuous optically sensitive layer, the third pixel region to collect charge substantially equal to the sum of the charge collected from the first pixel region and the charge collected from the second pixel region;
   a pixel circuit for each pixel region, each pixel circuit comprising a charge store and a read out circuit for each subpixel region; and
   circuitry alternately to enable:
      a first mode, a non-binning full-resolution mode, in which photocharge generated in the substantially continuous optically sensitive layer corresponding to the first pixel region is to be collected into a first charge store, photocharge generated in the substantially continuous optically sensitive layer corresponding to the second pixel region is to be collected into a second charge store; and
      a second mode, a binning mode, in which photocharge generated in the substantially continuous optically sensitive layer corresponding to the third pixel region is to be collected simultaneously into a third charge store, the third charge store having a higher capacitance than either the first charge store or the second charge store thereby providing a mode with a higher dynamic range.

2. The image sensor of claim 1, wherein a waveband for each subpixel is selected from the group consisting of red, green, blue, yellow, cyan, magenta, UV, and IR wavebands.

3. The image sensor of claim 1, further comprising a color filter overlying the first pixel region and the second pixel region.

4. The image sensor of claim 1, further comprising a single color filter having substantially the same spectral characteristics overlying both the first pixel region and also the second pixel region.

5. The image sensor of claim 1, further comprising:
   a first color filter overlying the first pixel region; and
   substantially no color filter overlying the second pixel region.

6. The image sensor of claim 1, further comprising:
   a first color filter having a first spectral characteristic overlying the first pixel region; and
   a second color filter having a second spectral characteristic overlying the second pixel region.

7. The image sensor of claim 1, wherein operating in the film-binning mode enables imaging with a higher signal-to-noise ratio compared to operating in an unbinned mode.

8. The image sensor of claim 1, wherein operating in the film-binning mode enables imaging with a higher in-scene dynamic range compared to operating in an unbinned mode.

* * * * *